United States Patent
Imokawa et al.

(10) Patent No.: US 9,200,165 B2
(45) Date of Patent: *Dec. 1, 2015

(54) SURFACE TREATMENT LIQUID FOR ZINC OR ZINC ALLOY COATED STEEL SHEET, ZINC OR ZINC ALLOY-COATED STEEL SHEET, AND METHOD FOR MANUFACTURING THE SAME

(75) Inventors: Toru Imokawa, Tokyo (JP); Takahiro Kubota, Tokyo (JP); Etsuo Hamada, Tokyo (JP); Masayasu Nagoshi, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 169 days.

This patent is subject to a terminal disclaimer.

(21) Appl. No.: 13/820,869

(22) PCT Filed: Sep. 20, 2011

(86) PCT No.: PCT/JP2011/005288
§ 371 (c)(1),
(2), (4) Date: Mar. 5, 2013

(87) PCT Pub. No.: WO2012/039128
PCT Pub. Date: Mar. 29, 2012

(65) Prior Publication Data
US 2013/0171468 A1    Jul. 4, 2013

(30) Foreign Application Priority Data

Sep. 24, 2010  (JP) ................................. 2010-214500

(51) Int. Cl.
| | |
|---|---|
| *C09D 5/08* | (2006.01) |
| *B32B 27/40* | (2006.01) |
| *C08G 18/08* | (2006.01) |
| *C09D 175/04* | (2006.01) |
| *C08K 3/00* | (2006.01) |
| *C08K 5/54* | (2006.01) |

(52) U.S. Cl.
CPC ............. *C09D 5/08* (2013.01); *C08G 18/0814* (2013.01); *C09D 5/084* (2013.01); *C09D 5/086* (2013.01); *C09D 175/04* (2013.01); *C08K 3/0091* (2013.01); *C08K 5/54* (2013.01); *Y10T 428/12569* (2015.01)

(58) Field of Classification Search
CPC .... C09D 175/04; C09D 175/08; C09D 5/084; C09D 5/086; C08L 61/12; C08L 75/04; C08G 18/0814; C08K 3/0091; C08K 5/54; C08K 5/56; C08K 13/02; B32B 27/08
USPC .................... 428/425.8, 425.9, 450
See application file for complete search history.

(56) References Cited

U.S. PATENT DOCUMENTS

| | | | |
|---|---|---|---|
| 7,875,363 B2* | 1/2011 | Okai et al. .................... | 428/626 |
| 8,648,135 B2* | 2/2014 | Fujibayashi et al. .......... | 524/413 |
| 2004/0167266 A1 | 8/2004 | Hasegawa et al. | |
| 2005/0147832 A1* | 7/2005 | Okai et al. .................... | 428/447 |
| 2008/0063896 A1* | 3/2008 | Fujibayashi et al. .......... | 428/684 |
| 2013/0084453 A1* | 4/2013 | Imokawa et al. ............. | 428/341 |

FOREIGN PATENT DOCUMENTS

| | | |
|---|---|---|
| CA | 2396041 A1 | 7/2001 |
| CA | 2451471 A1 | 1/2003 |
| JP | 53121034 A | 10/1978 |
| JP | 57044751 B | 9/1982 |
| JP | 1177380 A | 7/1989 |
| JP | 11058599 A | 3/1999 |
| JP | 11310757 A | 11/1999 |
| JP | 2000248369 A | 9/2000 |
| JP | 2001059184 A | 3/2001 |
| JP | 2001181860 A | 7/2001 |
| JP | 2003013252 A | 1/2003 |
| JP | 2003155451 A | 5/2003 |
| JP | 2004018887 A | 1/2004 |
| JP | 2004238716 A | 8/2004 |
| JP | 3573307 B2 | 10/2004 |
| JP | 2006043913 A | 2/2006 |
| JP | 2006082365 A | 3/2006 |
| JP | 20006152436 A | 6/2006 |
| JP | 38883831 B2 | 2/2007 |
| JP | 4078044 B2 | 4/2008 |
| WO | WO 2006/083656 A2 | 8/2006 |
| WO | WO 2009/084849 A2 | 7/2009 |
| WO | WO 2010/112605 A1 | 10/2010 |

OTHER PUBLICATIONS

Korean Patent Office (KIPO) Notice of Reasons for Rejection and English Translation for KR 10-2013-7007292, Issued Feb. 7, 2014.
International Preliminary Report on Patentability for International Application No. PCT/JP2011/005288 dated Apr. 16, 2013.
Extended European Search Report for EP 11826576.8 (Based on PCT/JP2011/005288); Issued Mar. 20, 2014.
International Search Report dated Dec. 27, 2011, application No. PCT/JP2011/005288.

* cited by examiner

*Primary Examiner* — Thao T Tran
(74) *Attorney, Agent, or Firm* — Ratnerprestia

(57) ABSTRACT

The present invention provides a chromium-free surface treatment liquid which enables forming, on a metal material surface, a film excellent in corrosion resistance at bent portions of a steel sheet, solvent resistance, coating properties after alkaline degreasing, and sweat resistance. The surface treatment liquid contains a resin compound having a specific bisphenol skeleton, a cationic urethane resin emulsion, a silane coupling agent, an organic titanium chelate compound, a quadrivalent vanadyl compound, a molybdate compound, a fluorine compound, and water at predetermined proportions. The pH of the surface treatment liquid is in the range of 4 to 5.

6 Claims, No Drawings

SURFACE TREATMENT LIQUID FOR ZINC OR ZINC ALLOY COATED STEEL SHEET, ZINC OR ZINC ALLOY-COATED STEEL SHEET, AND METHOD FOR MANUFACTURING THE SAME

CROSS REFERENCE TO RELATED APPLICATIONS

This is the U.S. National Phase application of PCT International Application No. PCT/JP2011/005288, filed Sep. 20, 2011, and claims priority to Japanese Patent Application No. 2010-214500, filed Sep. 24, 2010, the disclosure of both of which are incorporated herein by reference in their entireties for all purposes.

FIELD OF THE INVENTION

The present invention relates to a zinc or zinc alloy-coated steel sheet most suitable for applications to automobiles, consumer electrical appliances, and construction materials, and particularly to an environment-friendly zinc or zinc alloy-coated steel sheet containing no chromium or the like resulting from use thereof at the time of/during a manufacturing process. The present invention also relates to a method for manufacturing the steel sheet.

In particular, the present invention relates to a surface treatment liquid useful for improving sweat resistance or the like of a zinc or zinc alloy-coated steel sheet.

BACKGROUND OF THE INVENTION

In the prior art, a steel sheet subjected to chromate treatment by using treatment liquid including as main components chromic acid, dichromic acid, or salts thereof has been widely used as a steel sheet for consumer electrical appliances, a steel sheet for construction materials and a steel sheet for automobiles in order to improve corrosion resistance (white rust resistance and/or red rust resistance) of a surface of the zinc or zinc alloy-coated steel sheet. The chromate treatment is a relatively simple and economical method for obtaining steel sheets having good corrosion resistance.

Such chromate treatment as described above uses hexavalent chromium as a substance of which use is to be strictly controlled to prevent pollution. In the chromate treatment, hexavalent chromium is handled in a closed system in which hexavalent chromium is completely reduced and retrieved so that hexavalent chromium is not released into nature. Further, the chromium dissolution from a chromate film can be reduced to substantially zero by a sealing effect of an organic film. Accordingly, there is substantially no possibility that the environment and human bodies are polluted by hexavalent chromium. However, in view of the recent global environmental problems, a tendency toward self-imposed restraints on use of hexavalent chromium has become active. In addition, for protecting the environment from pollution caused by dumped shredder dust of wastes, movement of reducing hexavalent chromium in products as best as possible, to possibly eliminate it, has already begun.

Given that situation, many proposals of so-called chromium-free technology with no chromate treatment have been made for preventing white rust formation on zinc or zinc alloy-coated steel sheets using, for example, an inorganic compound, an organic compound, an organic polymer material, or a composition containing a combination of these materials. For example, such technology includes a technique of forming a surface treatment film on zinc or zinc alloy-coated steel sheets. Various effective techniques have been proposed so far; however, new problems to be solved, which have not been recognized up to this time have been found as such chromium-free technology becomes more popular.

A first object is to improve corrosion resistance at worked portions in zinc or zinc alloy-coated steel sheets. Surface-treated zinc or zinc alloy-coated steel sheets are made into product after working processes (cutting, bending, or welding of parts). When surface-treated zinc or zinc alloy-coated steel sheets are bent, the coating on a surface area of the bent portions is stretched. That is, the bending makes the surface treatment film being stretched. As a result, the surface treatment film is damaged to expose the zinc or zinc-coated surface, and corrosion resistance of the exposed portion is deteriorated, which is a problem. In particular, bending causes continuous damage on a film and coating unlike local damage caused by an extrusion process. Therefore, it is significantly difficult to make such worked (processed) portions have satisfactory corrosion resistance.

A second object is to ensure solvent resistance of a surface treatment film. In the above working processes, oil stain attached on or symbols written with a marker on a film surface are sometimes wiped off with solvents, and in such cases, a surface treatment film has often come off or turned into whitish color (bleached) due to the solvents. When the surface treatment film comes off, sufficient corrosion resistance of zinc or zinc alloy-coated steel sheets cannot be obtained, and appearance quality decreases when the surface treatment film is bleached.

A third object is to ensure coating properties of a surface treatment film. A surface of surface-treat zinc or zinc alloy-coated steel sheets processed as described above is sometimes coated after being washed with an alkaline cleaner or the like (alkaline-degreased) to clean the surface. Therefore, topcoat coating properties after such alkaline degreasing might be required; however, discussion about these properties has not yet been found in any prior documents.

A fourth object is to ensure blackening resistance. When zinc or zinc alloy-coated steel sheets are exposed to an environment at high moisture or high temperature for a long time, blacking likely occurs which blackens the coating surfaces. Such blackening becomes prominent when the coating layer includes an element such as Mg or Al in particular; thus, a surface treatment film on zinc or zinc alloy-coated steel sheets is required to be excellent in blackening resistance.

A fifth object is to ensure sweat resistance of a surface treatment film. In addition to the above blackening, when a person directly touches a zinc or zinc alloy-coated steel sheet containing an element such as Mg or Al, the portion touched is observed to turn into black over time. This is a phenomenon in which human sweat which is weekly acidic adheres to a steel sheet to blacken the steel sheet surface. Accordingly, a surface treatment film on a zinc or zinc alloy-coated steel sheet is also required not to turn into black even when sweat adheres to it, in other words, to be excellent in sweat resistance.

As described above, zinc or zinc alloy-coated steel sheets treated by surface treatment achieving various excellent characteristics are demanded. Concrete examples of conventional chromium-free techniques include the following.

JP S53-121034 discloses a method of forming a film by applying an aqueous solution containing water-dispersible silica, an alkyd resin, and a trialkoxysilane compound on a metal surface and drying it.

JP S57-44751 discloses a surface-treatment method aimed at imparting corrosion resistance to a metal material with the use of a water-soluble resin made of hydroxypyrone compound derivatives. Further, JP H1-177380 discloses a method of imparting corrosion resistance to a metal material with the use of an aqueous solution of a hydroxystyrene compound or a water-dispersible polymer.

JP H11-310757 discloses a technique using a surface treatment agent containing a water-based resin, colloidal silica, and ammonium vanadate at certain proportions.

However, any of the foregoing techniques have not developed a film imparting satisfactory corrosion resistance which can replace chromate films.

As another example, JP 2000-248369 discloses a technique of forming a surface treatment film containing an organic resin and a thiocarbonyl group-containing compound; however, sufficient corrosion resistance cannot be achieved after alkaline degreasing.

JP H11-58599 discloses a technique of treating a metal sheet surface with a treatment agent in which an aqueous solution of lithium silicate contains an organic resin, a silane coupling agent, and a solid lubricant. However, inorganic components easily form hard polymers, which would cause poor corrosion resistance at portions processed by bending or the like. Further, since the treatment agent contains an alkali metal, the secondary paint adhesion would not be enough.

JP 2006-43913 discloses a technique of forming a resin film with the use of an aqueous solution of resin which contains a carboxyl group-containing polyurethane resin, aqueous dispersion of an ethylene-unsaturated carboxylate copolymer, silica particles, and a silane coupling agent at certain proportions; however, the solvent resistance or the corrosion resistance of the processed portions are not enough.

JP 3573307 discloses steel sheets having a film containing a urethane-based resin, a lubricant, an inorganic colloid compound, and a silane coupling agent at certain proportions; however, the steel sheets are designed for electrodeposition coating, and the corrosion resistance at processed portions is not enough although they are excellent in electrodeposition coating properties.

JP 2001-59184 discloses a surface treatment liquid in which a silane coupling agent and a urethane resin are mixed to achieve a pH of 2.5 to 4.5; however, the corrosion resistance after alkaline degreasing is poor, and the solvent resistance is not enough either.

JP 2003-155451 discloses a technique of forming a film using a treatment agent containing an aqueous dispersion resin, silica particles, and organic titanate at certain proportions; however, the corrosion resistance at the processed portions is not enough.

JP 2006-82365 and JP 2004-238716 discloses a technique of forming a film using a treatment agent containing a certain water-based epoxy resin dispersion, a urethane resin dispersion, a silane coupling agent, a phosphoric acid and/or a phosphate compound, and a compound having 1 to 5 fluorine atoms in one molecule; however, some shortage of alkali resistance leaves room for improving corrosion resistance and coating properties after alkaline degreasing. Besides, there is room for improving corrosion resistance at the processed portions and solvent resistance.

JP 2001-181860 discloses a technique of forming a film with the use of a treatment agent containing a specific resin compound, a vanadium compound, and a certain metal; however, since alkali resistance is not enough, satisfactory corrosion resistance after alkaline degreasing is not obtained. Further, problems of tendency to yellowing under heating or the like have not been solved.

JP 3883831 discloses a technique of forming a film with the uses of a processing agent containing a specific resin compound, a cationic urethane resin having a cationic functional group, a silane coupling agent having a reactive functional group, a Ti compound, and an acid compound at certain proportions. According to this technique, a film excellent in corrosion resistance and fingerprint resistance can be obtained; however, corrosion resistance after alkaline degreasing, corrosion resistance at the processed portions, and solvent resistance are not discussed to leave room for such resistances to be improved.

JP 4078044 discloses a technique involving a surface treatment agent containing at least one type of water-based resin selected from cationic and nonionic urethane resins, a specific resin compound, a metal compound including a specific metal, and water. However, whichever of alkali resistance, corrosion resistance at the processed portions, and solvent resistance is not discussed, and these characteristics are not obtained sufficiently.

JP 2006-152436 discloses a technique of using a surface treatment agent containing cationic urethane, a cationic phenol-based polycondensate, titanium, and a compound containing a specific metal at certain proportions. However, no discussion about solvent resistance and coating properties has been made therein, and these characteristics were not satisfactory.

SUMMARY OF THE INVENTION

The present invention is aimed at solving the aforementioned conventional arts to provide a chromium-free surface treatment liquid for obtaining a zinc or zinc alloy-coated steel sheet on which a film excellent in corrosion resistance can be formed on a metal material surface, the zinc or zinc alloy-coated steel sheet being excellent in corrosion resistance at bent portions, corrosion resistance after alkaline degreasing, solvent resistance, coating properties after alkaline degreasing, and blackening resistance, and even excellent in sweat resistance. The present invention is also aimed at providing a zinc or zinc alloy-coated steel sheet using this surface treatment liquid and a method for manufacturing such zinc or zinc alloy-coated steel sheet.

In order to advantageously solve the aforementioned various problems, the inventors have made intensive studies.

As a result, they newly found that a film naturally excellent in corrosion resistance and also excellent in solvent resistance, coating properties, blackening resistance, and sweat resistance can be formed using a surface treatment liquid containing a specific resin compound, a specific cationic urethane resin emulsion, a silane coupling agent having a specific functional group, a specific organic Ti chelate compound, a quadrivalent vanadyl compound, a molybdate compound, and even a fluorine compound at certain proportions to treat a surface of a zinc or zinc alloy-coated steel sheet, and the characteristics of the film do not change even after being stored. The present invention has been completed on the basis of such findings, and the constituent features are as follows.

<1> A surface treatment liquid for a zinc or zinc alloy-coated steel sheet comprising: (A) a resin compound having a bisphenol skeleton represented by general formula (I) below; (B) a cationic urethane resin emulsion having at least one type of cationic functional group selected from the group consisting of primary to tertiary amino groups and a quaternary ammonium base; (C) at least one type of silane coupling agent having at least one type of reactive functional group selected from the group consisting of active hydrogen-containing amino group, epoxy group, mercapto group, and methacryloxy group; (D) an organic titanium chelate compound; (E) a quadrivalent vanadyl compound; (F) a molybdate compound; (G) a fluorine compound; and (H) water, wherein the components satisfy conditions (1) to (6) below, and pH of the surface treatment liquid is in the range of 4 to 5.

Conditions (1) A solid mass ratio $[(B_s)/\{(A_s)+(B_s)+(C_s)\}]$, which is a ratio of solid mass content $(B_s)$ of the cationic urethane resin emulsion (B) with respect to the total solid mass content $\{(A_s)+(B_s)+(C_s)\}$ of the resin compound (A), the cationic urethane resin emulsion (B), and the silane coupling agent (C), is in the range of 0.10 to 0.30.

(2) A solid mass ratio $[(C_s)/\{(A_s)+(B_s)+(C_s)\}]$, which is a ratio of solid mass content $(C_s)$ of the silane coupling agent (C) with respect to the total solid mass content $\{(A_s)+(B_s)+(C_s)\}$ of the resin compound (A), the cationic urethane resin emulsion (B), and the silane coupling agent (C), is in the range of 0.60 to 0.85.

(3) A mass ratio $\{(C_s)/(D_{Ti})\}$, which is a ratio of solid mass content $(C_s)$ of the silane coupling agent (C) with respect to mass content $(D_{Ti})$ in terms of titanium standard of the organic titanium chelate compound (D), is in the range of 50 to 70.

(4) A mass ratio $\{(E_v)/(D_{Ti})\}$, which is a ratio of mass content $(E_v)$ in terms of vanadium standard of the quadrivalent vanadyl compound (E) with respect to mass content $(D_{Ti})$ in terms of titanium standard of the organic titanium chelate compound (D), is in the range of 0.30 to 0.50.

(5) A mass ratio $[(F_{Mo})/\{(A_s)+(B_s)+(C_s)\}]$, which is a ratio of mass content $(F_{Mo})$ in terms of molybdenum standard of the molybdate compound (F) with respect to the total solid mass content $\{(A_s)+(B_s)+(C_s)\}$ of the resin compound (A), the cationic urethane resin emulsion (B), and the silane coupling agent (C), is in the range of 0.003 to 0.03.

(6) A mass ratio $[(G_F)/\{(A_s)+(B_s)+(C_s)\}]$, which is a ratio of mass content $(G_F)$ in terms of fluorine standard of the fluorine compound (G) with respect to the total solid mass content $\{(A_s)+(B_s)+(C_s)\}$ of the resin compound (A), the cationic urethane resin emulsion (B), and the silane coupling agent (C), is in the range of 0.01 to 0.1.

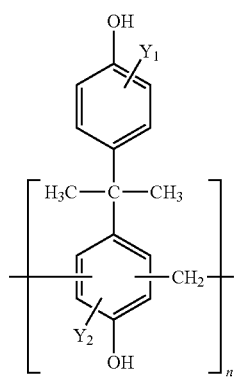

(I)

In general formula (I), $Y_1$ and $Y_2$ respectively bonded to benzene rings independently represent a hydrogen atom or a Z group represented by general formula (II) or (III) below; the average number of substituent Z groups per benzene ring is in the range of 0.2 to 1.0; and "n" is an integer in the range of 2 to 50.

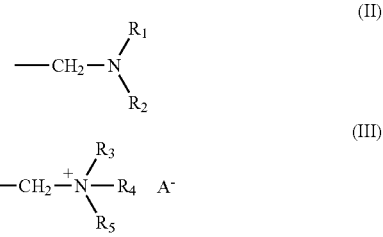

In general formula (II) or (III), $R_1$, $R_2$, $R_3$, $R_4$, and $R_5$ independently represent a hydrogen atom, a $C_1$-$C_{10}$ alkyl group, or a $C_1$-$C_{10}$ hydroxyalkyl group; and $A^-$ represents a hydroxide ion or an acid ion.

<2> The surface treatment liquid for a zinc or zinc alloy-coated steel sheet according to <1> above, further comprising wax (W), wherein a mass ratio $[(W_s)/\{(A_s)+(B_s)\}]$, which is a ratio of solid mass content $(W_s)$ of the wax (W) with respect to the total solid mass content $\{(A_s)+(B_s)\}$ of the resin compound (A) and the cationic urethane resin emulsion (B), is in the range of 0.2 to 0.4.

<3> A method of manufacturing a zinc or zinc alloy-coated steel sheet, comprising the steps of: applying by coating the surface treatment liquid of <1> or <2> above to a surface of a zinc or zinc alloy-coated steel sheet so that a coating amount after drying is in the range of 0.2 g/m² to 1.8 g/m² per surface; and drying the zinc or zinc alloy-coated steel sheet at an ultimate sheet temperature in the range of 50° C. to 180° C.

<4> A zinc or zinc alloy-coated steel sheet, comprising surface treatment film on a surface thereof at a film coating amount per surface is in the range of 0.2 g/m² to 1.8 g/m², wherein the surface treatment film is obtainable by applying the surface treatment liquid of <1> or <2> above to a steel sheet surface and drying the surface treatment liquid at an ultimate sheet temperature in the range of 50° C. to 180° C.

The present invention enables the formation of films having corrosion resistance comparable with chromate films, which are further excellent in corrosion resistance at portions bent in a bending step inserted in a manufacturing process, solvent resistance, coating properties after alkaline degreasing, blackening resistance, and sweat resistance. Thus, chromium-free zinc or zinc alloy-coated steel sheets which are more practical than conventional products can be obtained.

DETAILED DESCRIPTION OF EMBODIMENTS OF THE INVENTION

The present invention according to exemplary embodiments will be described in details below.

A steel sheet (material sheet) which is the base of a surface-treated steel sheet of the present invention is a zinc or zinc alloy-coated steel sheet of which base is a cold-rolled steel sheet, which is for consumer electrical appliances, construction materials, and components of automobiles. In particular, in order to achieve the effect of a surface treatment liquid of the present invention, zinc or zinc alloy-coated steel sheets are preferable.

As the zinc or zinc alloy-coated steel sheet, an electro-galvanized steel sheet, a galvanized steel sheet, a zinc-aluminum alloy coated steel sheet, a zinc-iron alloy coated steel sheet, a zinc-magnesium coated steel sheet, a zinc-aluminum-magnesium alloy coated steel sheet, or the like can be used. Note that the present invention can also be applied to aluminum-based materials such as an aluminum-coated steel sheet, an aluminum-Si alloy coated steel sheet, and an aluminum sheet, but preferably applied to a zinc or zinc alloy-coated steel sheet.

With respect to the zinc or zinc alloy-coated steel sheet, for the purpose of improving blackening resistance of the zinc or zinc alloy-coated steel sheet, Ni or Co may be slightly added to the coating or alternatively an acidic or alkaline aqueous solution containing Ni, Co or Fe may be used to precipitate these metals on a surface of the zinc or zinc alloy-coated steel sheet.

Next, a surface treatment liquid according to an embodiment of the present invention will be described.

A surface treatment liquid according to an embodiment of the present invention contains (A) a resin compound represented by general formula (I) below; (B) a cationic urethane resin emulsion; (C) at least one type of silane coupling agent having at least one type of reactive functional group selected from the group consisting of active hydrogen-containing amino group, epoxy group, mercapto group, and methacryloxy group; (D) an organic titanium chelate compound; (E) a quadrivalent vanadyl compound; (F) a molybdate compound; (G) a fluorine compound; and (H) water.

Here, a solid mass ratio $[(B_s)/\{(A_s)+(B_s)+(C_s)\}]$, which is a ratio of solid mass content $(B_s)$ of the cationic urethane resin emulsion (B) with respect to the total solid mass content $\{(A_s)+(B_s)+(C_s)\}$ of the resin compound (A), the cationic urethane resin emulsion (B), and the silane coupling agent (C), is in the range of 0.10 to 0.30.

A solid mass ratio $[(C_s)/\{(A_s)+(B_s)+(C_s)\}]$, which is a ratio of solid mass content $(C_s)$ of the silane coupling agent (C) with respect to the total solid mass content $\{(A_s)+(B_s)+(C_s)\}$ of the resin compound (A), the cationic urethane resin emulsion (B), and the silane coupling agent (C), is in the range of 0.60 to 0.85.

A mass ratio $\{(C_s)/(D_{Ti})\}$, which is a ratio of solid mass content $(C_s)$ of the silane coupling agent (C) with respect to mass content $(D_{Ti})$ in terms of titanium standard of the organic titanium chelate compound (D), is in the range of 50 to 70.

A mass ratio $\{(E_v)/(D_{Ti})\}$, which is a ratio of mass content $(E_v)$ in terms of vanadium standard of the quadrivalent vanadyl compound (E) with respect to mass content $(D_{Ti})$ in terms of titanium standard of the organic titanium chelate compound (D), is in the range of 0.30 to 0.50.

A mass ratio $[(F_{Mo})/\{(A_s)+(B_s)+(C_s)\}]$, which is a ratio of mass content $(F_{Mo})$ in terms of molybdenum standard of the molybdate compound (F) with respect to the total solid mass content $\{(A_s)+(B_s)+(C_s)\}$ of the resin compound (A), the cationic urethane resin emulsion (B), and the silane coupling agent (C), is in the range of 0.003 to 0.03.

A mass ratio $[(G_F)/\{(A_s)+(B_s)+(C_s)\}]$, which is a ratio of mass content $(G_F)$ in terms of fluorine standard of the fluorine compound (G) with respect to the total solid mass content $\{(A_s)+(B_s)+(C_s)\}$ of the resin compound (A), the cationic urethane resin emulsion (B), and the silane coupling agent (C), is in the range of 0.01 to 0.1.

Further the surface treatment liquid characteristically has a pH in the range of 4 to 5.

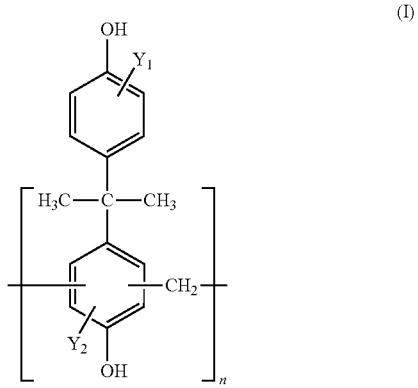

In general formula (I), $Y_1$ and $Y_2$ respectively bonded to benzene rings independently represent a hydrogen atom or a Z group represented by general formula (II) or (III) below; the average number of substituent Z groups per benzene ring is in the range of 0.2 to 1.0; and "n" is an integer in the range of 2 to 50.

Here, the average number of substituent Z groups is calculated by dividing the total number of Z groups by the total number of benzene rings (that is, 2n). In an embodiment of the present invention, when Y1 and Y2 are Z groups, the resin compound (A) has a cationic functional group of primary to tertiary amino groups and a quaternary ammonium base; thus, the resin compound can be stably dissolved in a surface treatment liquid having an acidity (pH: 4 to 5) targeted by the present invention. Further, in the present invention, the average degree of polymerization "n" is preferably set at 2 to 50.

When "n" is less than 2, the effect of imparting corrosion resistance is insufficient. Meanwhile, when "n" is more than 50, the resin compound (A) becomes less soluble in water and becomes increasingly viscous, which makes the resin compound (A) become less stable in the surface treatment liquid, and the storage stability of the surface treatment liquid becomes insufficient.

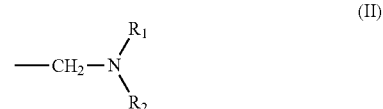

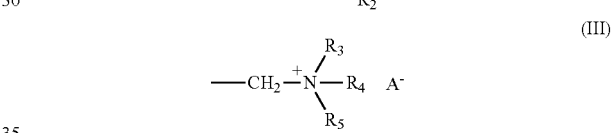

In general formulae (II) and (III), $R_1$, $R_2$, $R_3$, $R_4$, and $R_5$ independently represent a hydrogen atom, a $C_1$-$C_{10}$ alkyl group, or a $C_1$-$C_{10}$ hydroxyalkyl group. When the number of carbon atoms in the alkyl group or the hydroxyalkyl group is more than 10, the resin compound (A) becomes less soluble in water and becomes less stable in the surface treatment liquid. The resin compound (A) therefore cannot be used in the surface treatment liquid. Specific examples of $R_1$, $R_2$, $R_3$, $R_4$, and $R_5$ include methyl, ethyl, propyl, butyl, hydroxyethyl, 2-hydroxypropyl, and hydroxyisobutyl.

"A$^-$" represents a hydroxide ion or an acid ion. Specific examples of the acid ion include an acetate ion, a phosphate ion, and a formate ion.

The resin compound (A) represented by general formula (I) is a bisphenol-formalin condensation product. The bisphenol-formalin condensation product may be synthesized by any method. For example, it may be synthesized by the reaction of bisphenol A, formalin, and an amine in the presence of an alkaline catalyst.

The cationic urethane resin emulsion (B) in the surface treatment liquid may be any urethane resin having at least one type of cationic functional group selected from primary to tertiary amino groups and a quaternary ammonium base. The cationic urethane resin emulsion (B) may be composed of any polyol, that is, a monomer component, and any isocyanate, and may be synthesized by any method. The cationic functional group is not limited in particular and may be any one of primary to tertiary amino groups or a quaternary ammonium base, for example, an amino group, a methylamino group, an ethylamino group, a dimethylamino group, a diethylamino group, a trimethylamino group, or a triethylamino group.

The silane coupling agent (C) in a surface treatment liquid of the present invention is not limited in particular, as long as being at least one type of silane coupling agent having at least one type of reactive functional group selected from an active hydrogen-containing amino group, an epoxy group, a mercapto group, and a methacryloxy group. Above all, trialkoxysilane having three alkoxy groups is preferable. Specific examples of the silane coupling agent (C) include N-(aminoethyl)-3-aminopropyltrimethoxysilane, 3-aminopropyltrimethoxysilane, 3-glycidoxypropyltrimethoxysilane, 3-glycidoxypropylmethyldimethoxysilane, 2-(3,4-epoxycyclohexyl)ethyltriethoxysilane, and 3-mercaptopropyltrimethoxysilane.

Examples of the organic titanium chelate compound (D) in a surface treatment liquid of the present invention include titanium acetylacetonate, titanium octyleneglycolate, titanium tetraacetylacetonate, and titanium ethyl acetoacetate. Inorganic salts such as titanium nitrate, titanium sulfate, titanium acetate, titanium phosphate, and titanium carbonate are not preferred because they cannot be stably dissolved in a treatment agent of the present invention, or cannot achieve the effect of improving corrosion resistance. Note that when the organic titanium chelate compound is dissolved in water, titanium is dissolved as a chelate complex. Therefore preferably, a highly-polar water-soluble solvent or peroxides which may affect this complex should not be added.

The quadrivalent vanadyl compound (E) used in a surface treatment liquid of the present invention is not either limited in particular. Specific examples of the quadrivalent vanadyl compound (E) include vanadyl sulfate, vanadyl dichloride, vanadyl phosphate, vanadyl oxalate, and vanadyl acetylacetonate. Pentavalent vanadium compounds are preferably not used in the present invention because they are highly water-soluble and accordingly easily dissolve out of a film, which results in unsatisfactory improvement in corrosion resistance. As a quadrivalent vanadyl compound used in a surface treatment liquid of the present invention, a vanadyl compound generating $VO^{2+}$ (vanadyl) ions are best preferable because of a high effect of improving corrosion resistance.

The kind of the molybdate compound (F) used in a surface treatment liquid of the present invention is not either limited in particular. Specific examples of the molybdate compound (F) include molybdic acid, ammonium molybdate, sodium molybdate, potassium molybdate, magnesium molybdate, and zinc molybdate. Other examples include phosphorus molybdate, ammonium phosphomolybdate, and sodium phosphomolybdate. In the present invention, at least one compound selected from those is preferably used.

A preferred feature of the present invention is to add a fluorine compound (G) into the surface treatment liquid as a component for improving sweat resistance. Here, the kind of the fluorine compound (G) is not limited in particular. Specific examples of the fluorine compound (G) include acids such as hydrofluoric acid, (hydro)fluorosilicic acid, (hydro)fluoroboric acid, (hydro)fluorotitanic acid, and (hydro)fluorozirconic acid, and salts of them. In the present invention, at least one compound selected from those is preferably used.

In a surface treatment liquid of the present invention, a solid mass ratio $[(B_s)/\{(A_s)+(B_s)+(C_s)\}]$, which is a ratio of solid mass content $(B_s)$ of the cationic urethane resin emulsion (B) with respect to the total solid mass content $\{(A_s)+(B_s)+(C_s)\}$ of the resin compound (A), the cationic urethane resin emulsion (B), and the silane coupling agent (C), is preferably in the range of 0.10 to 0.30. When the mass ratio is less than 0.10, the proportion of the urethane resin is too low, so that the corrosion resistance and heat resistance of portions processed by bending, and storage stability of the surface treatment liquid deteriorate. On the other hand, when the mass ratio is more than 0.30, the solvent resistance is insufficient. More preferably, the mass ratio is 0.12 to 0.28.

Further, in a surface treatment liquid of the present invention, a solid mass ratio $[(C_s)/\{(A_s)+(B_s)+(C_s)\}]$, which is a ratio of solid mass content $(C_s)$ of the silane coupling agent (C) with respect to the total solid mass content $\{(A_s)+(B_s)+(C_s)\}$ of the resin compound (A), the cationic urethane resin emulsion (B), and the silane coupling agent (C), is preferably in the range of 0.60 to 0.85. When the mass ratio is less than 0.60, the solvent resistance is insufficient. Meanwhile, when the mass ratio is more than 0.85, the corrosion resistance of portions processed by bending or the storage stability of the surface treatment liquid decreases. More preferably, the mass ratio is 0.65 to 0.80.

In a surface treatment liquid of the present invention, a mass ratio $\{(C_s)/(D_{Ti})\}$, which is a ratio of solid mass content $(C_s)$ of the silane coupling agent (C) with respect to mass content $(D_{Ti})$ in terms of titanium standard of the organic titanium chelate compound (D), is preferably in the range of 50 to 70. When the mass ratio is less than 50, the corrosion resistance of processed portions by bending or the storage stability is insufficient. Meanwhile, when the mass ratio is more than 70, the dissolution of a film increases, and the coating properties after alkaline degreasing deteriorate accordingly. Preferably, the mass ratio is 55 to 65.

Note that in terms of calculating the mass ratio in accordance with the present invention, the mass of the solid mass content $(C_s)$ of the silane coupling agent (C) is a mass measured when alkoxysilane $(R-Si(-OR_1)_3)$ is hydrolyzed to be silanol $(R-Si(-OH)_3)$. This is because when a silane coupling agent is dissolved in water, most of the silane coupling agent is hydrolyzed, and alcohol produced by the hydrolysis is volatilized when a film is formed by applying a treatment agent of the present invention and drying it, which means that the alcohol does not function as an effective component.

In a surface treatment liquid of the present invention, a mass ratio $(E_v/D_{Ti})$, which is a ratio of mass content $(E_v)$ in terms of vanadium standard of the quadrivalent vanadyl compound (E) with respect to mass content $(D_{Ti})$ in terms of titanium standard of the organic titanium chelate compound (D), is preferably in the range of 0.30 to 0.50. When the mass ratio is less than 0.30, corrosion resistance is insufficient. Meanwhile, when the mass ratio is more than 0.50, coating properties after alkaline degreasing are degraded. Preferably, the mass ratio is 0.35 to 0.48.

In a surface treatment liquid of the present invention, a mass ratio $[(F_{Mo})/\{(A_s)+(B_s)+(C_s)\}]$, which is a ratio of mass content $(F_{Mo})$ in terms of molybdenum standard of the molybdate compound (F) with respect to the total solid mass content $\{(A_s)+(B_s)+(C_s)\}$ of the resin compound (A), the cationic urethane resin emulsion (B), and the silane coupling agent (C), is preferably in the range of 0.003 to 0.03. When the mass ratio is less than 0.003, blackening resistance is insufficient. Meanwhile, when the mass ratio is more than 0.03, satisfactory storage stability of the surface treatment liquid cannot be obtained. The mass ratio is preferably 0.006 or more to obtain a higher level of blackening resistance.

In a surface treatment liquid of the present invention, a mass ratio $[(G_F)/\{(A_s)+(B_s)+(C_s)\}]$, which is a ratio of mass content $(G_F)$ in terms of fluorine standard of the fluorine compound (G) with respect to the total solid mass content $\{(A_s)+(B_s)+(C_s)\}$ of the resin compound (A), the cationic urethane resin emulsion (B), and the silane coupling agent (C), is preferably in the range of 0.01 to 0.1. When the mass ratio is less than 0.01, sweat resistance is insufficient. Meanwhile, when the mass ratio is more than 0.1, satisfactory corrosion resistance and storage stability of the surface treatment liquid cannot be obtained. The mass ratio is preferably 0.07 or less to obtain a higher level of sweat resistance.

The surface treatment liquid of the present invention has a pH preferably in the range of 4 to 5. When the pH is less than 4, much zinc is dissolved out of a coating layer of a zinc or zinc alloy-coated steel sheet to be surface-treated to decrease corrosion resistance. On the other hand, when the pH is more than 5, satisfactory stability of the surface treatment liquid cannot be obtained.

Here, as an acidic agent used for adjusting the pH to 4 to 5, phosphoric acid, acetic acid, formic acid, hydrofluoric acid, fluoride, and the like are preferable, while strong acids such as sulfuric acid and nitric acid are not preferred. When sulfuric acid or nitric acid is used, cationic phenols or cationic urethanes are observed to have a tendency to turn into a gel-like material in the surface treatment liquid due to pH shock (local abrupt change of pH) in the pH adjustment. Further, this leads to the formation of salts which is easily dissolved to reduce corrosion resistance. Acetic acid and formic acid are weak acids, so that they are preferable for pH adjustment. Moreover, they are highly volatile to be volatilized when the agent of the present invention is dried. Accordingly, they hardly remain in the film. Thus, they are also preferable in that excessive addition of them would cause little performance degradation. On the other hand, as an alkaline agent used for adjustment for a pH of 4 to 5 when pH becomes too low, aqueous ammonia or amines with a boiling point of 100° C. or less are preferable. Note that when a strongly alkaline agent such as NaOH or KOH is used, pH shock occurs as in the case of using a strongly acidic agent, which would generate a gel-like material. Thus preferably, NaOH and KOH are not used.

Water (H) used in the present invention preferably has less effect on the components of the resin compound (A), the cationic urethane resin emulsion (B), the silane coupling agent (C), and the organic titanium chelate compound (D), and an acidic component or an alkaline component used for pH adjustment. For example, hardness increasing components such as Mg, Ca, or Si contained as impurities in water reduce the solubility and dispersibility of the resin compound (A) and/or the cationic urethane resin emulsion (B) of the present invention. This may be a factor of generating aggregates of these impurities, which is not preferable.

Further, when Na or Cl contained as an impurity in water remains in a film, it would reduce the corrosion resistance or reduce the coating adhesion. Therefore, water (H) used preferably contains less impurities; for example, the water preferably has an electrical conductance of less than 100 μS/cm. More preferably, the electrical conductance is 50 μS/cm or less, still more preferably, 10 μS/cm or less.

Note that the concentration of the solid mass content of the surface treatment liquid of the present invention after drying at 110° C. for two hours is preferably in the range of 4 mass % to 20 mass %. Specifically, when the concentration of the solid mass content is in the range of 4 mass % to 20 mass %, it is easy to ensure satisfactory coating amount of a surface-treating film described below. Further, the storage stability of the surface treatment liquid is satisfactory.

Basic components of a surface treatment liquid of the present invention have been described above. In the present invention, however, the following components may be contained in addition as necessary.

Specifically in the present invention, in order to ensure lubricity of a film, wax (W) may be contained in the surface treatment liquid.

The wax (W) is preferably prepared such that a mass ratio $[(W_s)/\{(A_s)+(B_s)\}]$, which is a ratio of solid mass content $(W_s)$ of the wax (W) with respect to the total solid mass content $\{(A_s)+(B_s)\}$ of the resin compound (A) and the cationic urethane resin emulsion (B), is in the range of 0.2 to 0.4. When the mass ratio is 0.2 or more, desired lubricity can be obtained. Meanwhile, when the mass ratio is 0.4 or less, lubricity is ensured, which is economically advantageous and does not reduce corrosion resistance, which is preferable. More preferably, the content is 0.3 to 0.4.

The wax (W) used in the present invention is preferably at least one type of wax selected from waxes with a melting point of 70° C. to 120° C. Specific examples of such waxes include polyethylene wax, oxidized polyethylene wax, polypropylene wax, and microcrystalline wax. When the melting point is 70° C. or more, desired lubricity can be obtained. Meanwhile, when the melting point is 120° C. or less, desired lubricity can be obtained as well as obtaining a film which is not too hard.

The wax (W) is preferably stably dispersed in water by an emulsifier to be an emulsion, and the particle diameter is preferably in the range of 0.08 μm to 0.3 μm. When the particle diameter is 0.08 μm or more, the effect of lubricity can be obtained, and the quantity of consumed emulsifier does not increase. Thus, the alkali resistance or coating properties is not degraded. On the other hand, a particle diameter of 0.3 μm or less is preferable because floatation in the treatment agent due to decrease in the specific weight of the wax (W) does not occur and storage stability is satisfactory.

Furthermore, a defoaming agent or a wettability improver may be added to the surface treatment liquid of the present invention as necessary. The kind of the defoaming agent is not limited in particular, for example, a silicone or fatty acid emulsion type can be used. A wettability improver reduces surface tension of a surface treatment liquid and improves wettability with zinc or zinc alloy-coated steel sheets to improve appearance uniformity. Examples of the wettability improver include water-soluble solvents such as ethanol, T-butanol, and butyl cellosolve, but are not limited thereto. Moreover, wettability improvers containing acetylene are preferable because they also have defoaming effect. A nitrate such as nickel nitrate or ammonium nitrate may be added further to the surface treatment liquid of the present invention in order to improve blackening resistance. As described above, nitric acid causes pH shock; however, a nitrate does not cause pH shock.

Next, a method of manufacturing a coated steel sheet with the use of the above surface treatment liquid and the resultant coated steel sheets will be described. When a surface treatment film is formed on a coated steel sheet, with the use of a surface treatment liquid of the present invention, the surface treatment liquid is applied to the coated steel sheet, which is then dried at an ultimate sheet temperature of 50° C. to 180° C. The surface treatment film formed at a coating amount in the range of 0.2 g/m$^2$ to 1.8 g/m$^2$ per surface needs be formed on the steel sheet surface.

On this occasion, when the coating amount of the surface treatment film per surface is less than 0.2 g/m$^2$, sufficient corrosion resistance cannot be obtained. On the other hand, when the coating amount is more than 1.8 g/m$^2$, the effect of the coating amount is saturated, which not only is economically disadvantageous but also degrades coating properties. Therefore, the coating amount per surface is 0.2 g/m$^2$ to 1.8 g/m$^2$, more preferably in the range of 0.3 g/m$^2$ to 1.6 g/m$^2$, and still more preferably, 0.4 g/m$^2$ to 1.4g/m$^2$.

As a method of applying a surface treatment liquid of the present invention to a coated steel sheet, any conventionally known methods such as of roll coaters (such as 3-roll coaters, 2-roll coaters), squeeze coaters, die coaters, etc can be used. After the application, dipping, or spraying by the use of a squeeze coater or the like, the coating amount may be controlled, the appearance may be unified, and its film thickness may be unified by to an air-knife method or a roll-squeezing method.

After the coated steel sheet is thus coated (application by coating) with the surface treatment liquid of the present invention, it is dried under heat, without being rinsed with water. For drying it under heat, usable are driers, hot air furnaces, high-frequency induction heating furnaces, IR furnaces, etc. The surface treatment liquid is dried at an ultimate sheet temperature in the range of 50° C. to 180° C. as described above. If the ultimate sheet temperature is lower than 50° C., much water will remain in the film and the corrosion resistance of the film will be low. On the other hand, if the temperature is higher than 180° C., it is uneconomical and, in addition, the film will be hard and brittle, and the corrosion resistance at the processed portion of the film will be low.

A surface of the coated steel sheet of the present invention having a surface treatment film formed by the above method may be further coated with a resin film to achieve further higher corrosion resistance.

Note that a surface treatment film formed using the surface treatment liquid of the present invention may be applied to either one surface or both surfaces of a coated steel sheet.

Next, effects of the present invention will be described. The components in a surface treatment liquid of the present invention are assumed to have effects mentioned below; however, the present invention is not limited to the assumption in any respect. The surface treatment liquid of an embodiment of the present invention is mainly composed of a resin compound (A), a cationic urethane resin emulsion (B), and a silane coupling agent (C), and the framework of a film is formed of these main components.

The pH of the surface treatment liquid containing the resin compound (A) having a cationic functional group (general formula (II) or (III) given above) is adjusted to be weakly acidic, to increase the stability of the surface treatment liquid; thus, satisfactory storage stability is ensured. Further, the resin compound (A) is cationized to be less soluble in alkaline solutions, so that a film having alkali resistance can be obtained. Moreover, bisphenol is selected as a phenol skeleton of the resin compound (A); thus, the film becomes less soluble in a polar solvent (solvent resistance is imparted), and the adhesion and corrosion resistance are improved.

However, the resin compound (A) is easily become yellowish due to heat (reduction in heat yellowing resistance) and is likely to be a hard film. Accordingly, a cationic urethane resin emulsion (B) is preferably used for the present invention to reduce hardness of a phenol resin, thereby ensuring corrosion resistance at processed portions.

The cationic urethane resin emulsion (B) has the above effect; however, it makes a film easily come off (being peeled off) due to a polar solvent. In view of this, in the present invention, in order to ensure sufficient solvent resistance (with respect to a polar solvent) and yellowing resistance, the silane coupling agent (C) is preferably added. The silane coupling agent (C) contributes to improvements in adhesion to a material (zinc-coating layer) or a topcoat coating film because a terminal alkoxy group is hydrolyzed to generate an active silanol group (Si—OH). Further, the silane coupling agent (C) is partially condensed by dehydration to generate siloxane bonds (Si—O—Si), and the siloxane bonds are bound to be polymerized (into polysiloxane: —Si—O—Si—O—Si—). This provides an exceedingly stable structure, which allows a film to have corrosion resistance, solvent resistance, and yellowing resistance.

Accordingly, a resin compound (A), a cationic urethane resin emulsion (B), and a silane coupling agent (C) which are main components of the surface treatment liquid are used at an appropriate rate; thus, performance corresponding to each component is considered to be obtained in a balanced manner. However, the main components alone cannot provide a satisfactory solution for solving conventional problems and the problem of blackening phenomenon. Given this situation, with respect to the surface treatment liquid of the present invention, an organic titanium chelate compound (D) is a beneficial component in addition to the main components. The organic titanium chelate compound (D) is assumed to serve as a catalyzer for promoting the polymerization into polysiloxane when the surface treatment liquid is dried to form a film. This remarkably improves alkali resistance of the film and the corrosion resistance after alkaline degreasing, and also improves solvent resistance and coating properties thereof.

In order to achieve such effects, as described above, the organic titanium chelate compound (D) having an amount predetermined depending on the amount of the silane coupling agent (C) is necessary. When the amount is small, desired effects cannot be obtained, and when the amount is excessive, polysiloxane excessively increases and the resultant film becomes hard and brittle, which reduces the corrosion resistance at the processed portion. The polymerization into polysiloxane due to the organic titanium chelate compound (D) is ideally promoted during the formation of films; however, the polymerization into polysiloxane is promoted even when the surface treatment liquid is stored. Therefore, when the content of the organic titanium chelate compound (D) is excessive, the storage stability (suppression of increase in viscosity and gelation) of the surface treatment liquid decreases and the quality of the agent before storage cannot be obtained after the storage.

Further, a quadrivalent vanadyl compound (E) is also a beneficial component in a surface treatment liquid of the present invention. In the present invention, a quadrivalent vanadyl compound (E) is assumed to serve as a corrosion inhibitor (for example, passivation of zinc). In particular, a vanadyl ion [$VO^{2+}$] having one oxygen atom is hardly dissolved even in a humid environment, and has the inhibiting effect while remaining in a film. Therefore, even when the coated steel sheet is subjected to high deformation such as bending and the surface treatment film or the coating surface itself suffer ductile damage, the corrosion resistance or corrosion resistance after alkaline degreasing of the damaged portion is assumed to be improved. Note that the inventors assume that such effects are achieved by the synergistic effect of vanadyl ions and Ti ions that are also present as cations, provided that the condition that the film framework having cationic functional group is appropriate.

Still further, a molybdate compound (F) is also a beneficial component in a surface treatment liquid of the present invention. In the present invention, the molybdate compound (F) is added, so that excellent blackening resistance can be obtained.

Blackening of zinc or zinc alloy-coating occurs irrespective of the kind of coating (electrocoating, hot dipping). Particularly in galvanizing, Mg, Al, or the like is added to improve the corrosion resistance or to improve adhesion between the zinc coating and a material (a steel sheet), and they are concentrated on a coating interface of the zinc or zinc alloy-coating or on the superficial layer of the coating to promote blackening, which leads to more blackening. It is known that the blackening resistance decreases when surface treatment for improving white rust resistance of the zinc or zinc alloy-coating is performed.

As mentioned above, the cause of blackening of a zinc or zinc alloy-coating under high temperature and high humidity conditions is yet unrevealed; however, zinc oxide formed on the outermost surface of the zinc or zinc alloy-coating would be deprived of oxygen to turn into oxygen-deficient zinc oxide, or oxygen would not be supplied in the process of zinc corrosion (oxidation) to produce oxygen-deficient zinc oxide. Such oxygen-deficient zinc oxides are said to seem black in color.

In an embodiment of the present invention, a molybdate compound is introduced into a surface treatment film to obtain excellent blackening resistance. Specifically, molybdenum is a transition metal, and there are $MoO_2$ and $MoO_3$ which are oxides obtained by combination of molybdenum and oxygen. Molybdic acid is obtained by combination of such oxide and more oxygen atom(s) ($MoO_4^{2-}$). Accordingly in the present invention, molybdic acid ($MoO_4^{2-}$) can partially turn into an oxide of molybdenum ($MoO_3$ or the like) under high temperature and high humidity conditions or under corrosive environment; thus, oxygen is properly supplied to the zinc coating surface, which is considered to make oxygen-deficient zinc oxide less formable. The inventors estimate that a surface treatment film suppressing blackening was obtained due to such a mechanism.

Importantly, the surface treatment liquid of the present invention preferably contains a fluorine compound (G) as another beneficial component.

This is important because the addition of the fluorine compound (G) makes it possible to obtain excellent sweat resistance. When a person directly touches a zinc or zinc alloy-coated steel sheet, human sweat adheres to the steel sheet, and the touched portion is blackened over time. The blackening mechanism is not revealed yet. However, slight corrosion is observed on a superficial layer of the zinc or zinc alloy-coating. For this reason, it is considered that the superficial layer of the zinc or zinc alloy-coating is weakly oxidized by human sweat (weakly acidic) to become a starting point of corrosion; the corrosion gradually grow on the very outer surface of the zinc coating to seem black. Specifically, the effect of adding the fluorine compound (G) generates hardly-soluble compounds such as fluorides of Zn, Al, or Mg on the superficial layer of the zinc coating when the surface treatment liquid and the zinc or zinc alloy-coated steel sheet surface come in contact with each other, and the superficial layer of the coating is stabilized. Thus, the inventors estimate that the effect can suppress the blackening caused by human contact. On that occasion, hydrofluoric acids or salts of them which easily generate $F^-$ ions are preferred in particular because they are very effective in improving sweat resistance.

EXAMPLE

A resin compound (A) shown in Tables 1 (Table 1a and Table 1b), a cationic urethane resin emulsion (B) shown in Table 2, a silane coupling agent (C) shown in Table 3, a titanium compound (D) shown in Table 4, a vanadium compound (E) shown in Table 5, a molybdate compound (F) shown in Table 6, a fluorine compound (G) shown in Table 7, and a wax (W) emulsion shown in Table 8 were mixed as appropriate to prepare a surface treatment liquid. As a material sheet, a galvanized steel sheet shown in Table 9 was used.

For example, a surface treatment liquid of each example was prepared to have a composition shown in Tables 10-1 to 12-1. The pH of each agent was adjusted using acetic acid and ammonia to pH shown in Tables 10-2 to 12-2, and prepared to have a solid mass content concentration of 10 mass % after drying at 110° C. for two hours by means of deionized water. The pH of other surface treatment liquids was also adjusted using acetic acid as an acid portion and ammonia as an alkaline portion, and the solid mass content concentration was set at 10 mass %. Note that for the deionized water above, ion-exchange water having an electrical conductance of 10 μS/cm was used.

A surface of a coated steel sheet shown in Table 13 was subjected to alkaline degreasing, rinsed with water, dried, and then one surface of the steel sheet was coated with a surface treatment liquid shown in Tables 10 to 12 using a roll coater. Then, without water rinsing, heat drying was performed so that the drying temperatures shown in Table 13 were the ultimate sheet temperature to manufacture coated steel sheets having a surface treatment film. The coating amount on one surface of the surface treatment film was adjusted depending on the coating condition (rolling force, revolving speed, etc).

The coating amounts are shown in Tables 13.

Note that the amount of coating was determined by measuring Si of the contained silane coupling agent (C) using an X-ray fluorescence spectrometer, and converting the Si coating amount into the film coating amount.

The quality (flat-portion corrosion resistance, corrosion resistance at bent portions, corrosion resistance after alkaline degreasing, blackening resistance, heat discoloration resistance, coating properties, coating properties after alkaline degreasing, solvent resistance, storage stability, sweat resistance, and lubricity) of the resultant surface treatment liquid and zinc or zinc alloy-coated steel sheets manufactured using the surface treatment liquid was tested. The results are shown in Tables 14. Note that the quality performance was evaluated under the following conditions.

(1) Flat-portion corrosion resistance

Each sample was subjected to a salt spray test (JIS-Z-2371-2000) and evaluated with respect to the ratio of area where white rust was generated after 120 hours. The evaluation criteria were as follows.
A: White rust area ratio: 0%
B+: White rust area ratio: less than 5%
B: White rust area ratio: 5% or more, less than 10%
B-: White rust area ratio: 10% or more, less than 20%
C: White rust area ratio: 20% or more, less than 40%
D: White rust area ratio: 40% or more (2) Corrosion resistance at bent portions Each sample was bent at 180° so as to sandwich a pole having a diameter of 2 mm (made of stainless steel) in between, and clamped with a vise. The bent samples were subjected to a salt spray test (JIS-Z-2371-2000), and evaluated with respect to the ratio of area where white rust was generated on the outer side (surface) of the bent portion after 72 hours. The evaluation criteria were as follows.
A: White rust area ratio at the bent portion: 0%
B+: White rust area ratio at the bent portion: less than 5%
B: White rust area ratio at the bent portion: 5% or more, less than 10%
B-: White rust area ratio at the bent portion: 10% or more, less than 40%
C: White rust area ratio at the bent portion: 40% or more, less than 80%
D: White rust area ratio at the bent portion: 80% or more (3) Corrosion resistance after alkaline degreasing An alkaline degreaser "CL-N364S" (Nihon Parkerizing Co., Ltd.) was dissolved in purified water at a concentration of 20 g/L and heated to 60° C. Each sample was immersed in the alkaline solution for 2 minutes, taken out, rinsed with water, and dried. Each sample was subjected to a salt spray test (JIS-Z-2371-2000), was evaluated with respect to the white rust area ratio after 72 hours. The evaluation criteria were as in the evaluation shown in (1) above.

(4) Blackening resistance

Change of lightness (L value) after each sample was left to stand still in a thermohygrostat in which the atmosphere was controlled at a temperature of 80° C. and a relative humidity of 95% for 24 hours was calculated by (ΔL=L value after test−L value before test). The evaluation criteria were as follows. The L value was measured using "SR2000" manufactured by NIPPON DENSHOKU INDUSTRIES CO., LTD. with an SCE (specular component excluded) mode.

A: −6≤ΔL
B: −10≤ΔL<−6
C: −14≤ΔL<−10
D: ΔL<−14

(5) Heat Discoloration Resistance

Each sample was heated in an infrared image furnace at a sheet temperature of 500° C. for 30 seconds, maintained for 30 seconds, and then naturally cooled in air to room temperature. The surface appearance of the samples at this time was visually observed. The evaluation criteria were as follows.

A: No change in color
B: Slightly brownish
C: Tint brown
D: Brown (6) Coating Properties Each sample was painted with DELICON (registered trademark) #700 (product by DAI NIPPON TORYO CO., LTD.) which was a melamine alkyd paint, baked at 130° C. for 30 minutes, thus coated with a coating film having a film thickness of 30 μm, then immersed in boiling water for two hours, and immediately cut to the steel base into grids (10×10 pieces, 1 mm intervals). Further, each sample was 5 mm extruded by an Erichsen extruder so that the cut portion was on the outer side (surface), then an adhesive tape was attached to the sample and it was removed to measure peeling area of the coating film. The evaluation criteria were as follows. Note that the Erichsen extrusion conditions conforming to JIS-Z-2247-2006 were as follows: punch diameter: 20 mm, die diameter: 27 mm, and width of drawing: 27 mm.

A: No peeling
B+: Peeling area: less than 3%
B: Peeling area: 3% or more, less than 10%
B−: Peeling area: 10% or more, less than 20%
C: Peeling area: 20% or more, less than 50%
D: Peeling area: 50% or more (7) Coating properties after alkaline degreasing Each sample was subjected to alkaline degreasing similar to (3) above, and was subjected to a coating property test similar to (6) above. The evaluation criteria were also the same as (6) above.

(8) Solvent resistance

Gauze impregnated with methanol was impressed on a surface of each sample under a load of 4.90 N (500 gf), and was made to scratch the sample back and forth ten times while maintaining the load. The scratch marks were visually observed for evaluation. The evaluation criteria were as follows.

A: No mark
B+: No mark seen from above, slight mark seen obliquely
B: No mark seen from above, obvious marks seen obliquely
B−: Slight mark seen from above
C: Obvious marks seen from above
D: The film is peeled (came off)

(9) Storage Stability

Each surface treatment liquid sample shown in Tables 10 was stored in a thermostatic chamber maintained at 40° C. for 30 days. After taking the sample out of the chamber, the appearance of each surface treatment liquid sample was examined by visual observation for evaluation. The evaluation criteria were as follows.

A: No change
B: Slight precipitation observed
C: Small amount of precipitation observed, or viscosity increased to some extent
D: Large amount or precipitation observed, or gelation observed

(10) Sweat resistance

10 μL of artificial sweat in conformance with JIS B7001-1995 was dripped on a surface of each sample and a silicone rubber stopper was forced on the portion applied with the artificial sweat to form a certain area of a region contaminated with the artificial sweat. This test piece was left to stand still in a thermohygrostat in which the atmosphere was controlled at a temperature of 40° C. and a relative humidity of 80% for 4 hours. After that, change in the appearance of the region contaminated with the artificial sweat was evaluated. The evaluation criteria were as follows.

A: No change
B: Slight discoloration
C: Blackened to a small extent
D: Apparently blackened

(11) Lubricity

A disk-shaped test piece having a diameter of 100 mm was cut out of each sample and was molded into a cup shape under the following conditions: punch diameter: 50 mm, die diameter: 51.91 mm, and blank holding force: 1 ton. The appearance of the surface of the molded product, which had been machined by draw press (outer side of the cup side) was examined by visual observation to evaluate the degree of damage and blackening. The evaluation criteria were as follows.

A: Inappreciable change observed across the entire surface, uniform appearance
B+: Slightly blackened, uniform appearance
B: Slightly damaged and blackened, apparently nonuniform appearance
B−: Locally damaged and blackened, apparently nonuniform appearance
C: Damaged mainly at corner portions and seriously blackened
D: Broken without being molded TABLE 1a

| | Resin compound (A) | | | | | |
|---|---|---|---|---|---|---|
| | Y1 Z group: general formula (II) | | Y2 Z group: general formula (II) | | Average number of substituted Z | |
| No. | R1 | R2 | R1 | R2 | groups | n |
| A1 | Hydrogen | Hydrogen | Methyl | Ethyl | 0.4 | 5 |
| A2 | Ethyl | Methyl | Hydrogen | Propyl | 0.7 | 3 |
| A3 | Ethyl | Propyl | Hydrogen | Ethyl | 0.4 | 10 |
| A4 | Hydroxyethyl | Hydroxyethyl | Hydroxyethyl | Hydroxyethyl | 0.5 | 5 |
| A5 | —$C_{12}H_{23}$ | Methyl | Hydrogen | Hydrogen | 0.5 | 5 |

TABLE 1a-continued

Resin compound (A)

| | Y1 Z group: general formula (II) | | Y2 Z group: general formula (II) | | Average number of substituted Z | |
|---|---|---|---|---|---|---|
| No. | R1 | R2 | R1 | R2 | groups | n |
| A6 | —C$_{12}$H$_{22}$OH | Methyl | Hydrogen | Hydrogen | 0.5 | 5 |
| A7 | Hydrogen | Hydrogen | Methyl | Ethyl | 0.1 | 5 |
| A8 | Hydrogen | Hydrogen | Methyl | Ethyl | 1.2 | 5 |
| A9 | Hydrogen | Hydrogen | Methyl | Ethyl | 0.4 | 80 |

* A group represented by general formula (II) was used as the Z group.

TABLE 1b

Resin compound (A)

| | Y1 Z group: general formula (III) | | | Y2 Z group: general formula (III) | | | Average number of substituted Z | |
|---|---|---|---|---|---|---|---|---|
| No. | R3 | R4 | R5 | R3 | R4 | R5 | groups | n |
| A10 | Hydrogen | Hydrogen | Methyl | Methyl | Ethyl | Methyl | 0.4 | 5 |
| A11 | Ethyl | Methyl | Hydrogen | Hydrogen | Propyl | Hydrogen | 0.7 | 3 |
| A12 | Ethyl | Propyl | Methyl | Hydrogen | Ethyl | Methyl | 0.4 | 10 |
| A13 | Hydroxyethyl | Hydroxyethyl | Hydrogen | Hydroxyethyl | Hydroxyethyl | Hydrogen | 0.5 | 5 |
| A14 | —C$_{12}$H$_{23}$ | Methyl | Hydrogen | Hydrogen | Hydrogen | Hydrogen | 0.5 | 5 |
| A15 | —C$_{12}$H$_{22}$OH | Methyl | Hydrogen | Hydrogen | Hydrogen | Hydrogen | 0.5 | 5 |
| A16 | Hydroxyethyl | Hydroxyethyl | Hydrogen | Hydroxyethyl | Hydroxyethyl | Hydrogen | 0.1 | 5 |
| A17 | Hydroxyethyl | Hydroxyethyl | Hydrogen | Hydroxyethyl | Hydroxyethyl | Hydrogen | 1.2 | 5 |
| A18 | Hydroxyethyl | Hydroxyethyl | Hydrogen | Hydroxyethyl | Hydroxyethyl | Hydrogen | 0.5 | 70 |

* A group represented by general formula (III) was used as the Z group.

TABLE 2

Urethane compound (B)

| No. | Urethane compound (B) | Ionicity | Manufacturer |
|---|---|---|---|
| B1 | ADEKA BONTIGHTER HUX-670 | Cation | ADEKA CORPORATION |
| B2 | SUPERFLEX 600 | Cation | DAI-ICHI KOGYO SEIYAKU CO., LTD. |
| B3 | PERMARIN UC-20 | Cation | Sanyo Chemical Industries, Ltd. |
| B4 | ADEKA BONTIGHTER UX-206 | Nonion | ADEKA CORPORATION |
| B5 | HYDRAN AP-10 | Anion | DIC Corporation |

TABLE 3

Silane coupling agent (C)

| No. | Silane coupling agent (C) |
|---|---|
| C1 | 3-Mercaptopropyltrimethoxysilane |
| C2 | N-(2-Aminoethyl)-3-aminopropyltrimethoxysilane |
| C3 | 3-Glycidoxypropyltrimethoxysilane |
| C4 | 3-Methacryloxypropyltrimethoxysilane |
| C5 | Vinyltrimethoxysilane |

TABLE 4

Titanium compound (D)

| No. | Titanium compound (D) |
|---|---|
| D1 | Titanium acetylacetonate (Ti: 12.5 mass %) |
| D2 | Titanium tetraacetylacetonate (Ti: 10.8 mass %) |
| D3 | Titanium nitrate (Ti: 16.2 mass %) |
| D4 | Hydrofluorotitanic acid (TI: 29.2 mass %) |

TABLE 5

Vanadium compound (E)

| No. | Vanadium compound (E) |
|---|---|
| E1 | Vanadyl oxalate (V: 32.9 mass %) |
| E2 | Vanadyl acetylacetonate (V: 19.2 mass %) |
| E3 | Vanadyl sulfate (V: 31.2 mass %) |
| E4 | Ammonium metavanadate (V: 43.5 mass %) |

TABLE 6

Molybdate compound (F)

| No. | Molybdate compound (F) |
|---|---|
| F1 | Na$_2$MoO$_4$•2H$_2$O |
| F2 | (NH$_4$)$_6$Mo$_7$O$_{24}$•4H$_2$O |
| F3 | (NH$_4$)$_3$[PMo$_{12}$O$_{40}$]•3H$_2$O |

TABLE 7

Fluorine compound (G)

| No. | Fluorine compound (G) |
|---|---|
| G1 | Hydrofluoric acid |
| G2 | (Hydro)fluorosilicic acid |
| G3 | (Hydro)fluorotitanic acid |
| G4 | Ammonium hydrogen fluoride |
| G5 | Sodium fluoride |

TABLE 8

Wax (W) emulsion

| No. | Wax type (W) | Melting point (°C.) | Dispersed solid (mass %) | Particle diameter (μm) |
|---|---|---|---|---|
| W1 | Oxidized polyethylene wax | 115 | 20 | 0.1 |
| W2 | Microcrystalline wax | 90 | 20 | 0.1 |
| W3 | Paraffin wax | 50 | 20 | 0.1 |

*The waxes are forcibly emulsified with an emulsifier.

TABLE 9

Zinc-coated steel sheet

| No. | Material sheet (coated steel sheet) | Coating amount |
|---|---|---|
| GF1 | Hot-dip Zn - 5.0 mass % Al - 0.6 mass % Mg - 0.04 mass % Ni alloy coated steel sheet | 90 g/m$^2$ |
| GF2 | Hot-dip Zn - 4.5 mass % Al - 0.8 mass % Mg - 0.03 mass % Ni alloy coated steel sheet | 60 g/m$^2$ |
| GF3 | Hot-dip Zn - 5.1 mass % Al - 0.9 mass % Mg - 0.09 mass % Ni alloy coated steel sheet | 90 g/m$^2$ |
| GF4 | Hot-dip Zn - 5.0 mass % Al - 0.5 mass % Mg alloy coated steel sheet | 90 g/m$^2$ |
| GF5 | Hot-dip Zn - 5.1 mass % Al alloy coated steel sheet | 90 g/m$^2$ |

*The coating amount is per surface (Actually, both surfaces are coated).

TABLE 10-1

| | | (A) Type Table 1 | (A) Solid mass content Mass % | (B) Type Table 2 | (B) Solid mass content Mass % | (C) Type Table 3 | (C) Solid mass content Mass % | (D) Type Table 4 | (D) Equivalent Ti Mass % |
|---|---|---|---|---|---|---|---|---|---|
| 1 | Invention Example 1 | A1 | 4 | B1 | 16 | C1 | 60 | D1 | 1 |
| 2 | Invention Example 2 | A1 | 10 | B1 | 10 | C1 | 60 | D1 | 1 |
| 3 | Invention Example 3 | A1 | 11 | B1 | 9 | C1 | 60 | D1 | 1 |
| 4 | Comparative Example 1 | A1 | 14 | B1 | 6 | C1 | 60 | D1 | 1 |
| 5 | Invention Example 4 | A1 | 0.5 | B1 | 21.5 | C1 | 58 | D1 | 1 |
| 6 | Invention Example 5 | A1 | 0.5 | B1 | 23.5 | C1 | 56 | D1 | 1 |
| 7 | Comparative Example 2 | A1 | 0.1 | B1 | 25.9 | C1 | 55 | D1 | 1 |
| 8 | Comparative Example 3 | A1 | 4 | B1 | 16 | C1 | 60 | D3 | 1 |
| 9 | Comparative Example 4 | A1 | 4 | B1 | 16 | C1 | 60 | D4 | 1 |
| 10 | Comparative Example 5 | A1 | 4 | B1 | 16 | C1 | 60 | D1 | 1 |
| 11 | Comparative Example 6 | A1 | 4 | B1 | 16 | C1 | 60 | D1 | 1 |
| 12 | Comparative Example 7 | A1 | 29 | B1 | 6 | C1 | 65 | D4 | 1.134 |
| 13 | Comparative Example 8 | A1 | 29 | B1 | 6 | C1 | 65 | D4 | 1.134 |
| 14 | Comparative Example 9 | A1 | 20 | B1 | 40 | C2:C3 = 1:1 | 20 | D4 | 1 |
| 15 | Invention Example 6 | A2 | 4 | B1 | 16 | C2 | 60 | D1 | 1 |
| 16 | invention Example 7 | A3 | 4 | B1 | 16 | C2 | 60 | D2 | 1 |
| 17 | Invention Example 8 | A1 | 4 | B1 | 16 | C3 | 60 | D1 | 1 |
| 18 | Invention Example 9 | A1 | 4 | B1 | 19 | C1 | 60 | D1:D4 = 10:1 | 1.1 |
| 19 | Comparative Example 10 | A1 | 19 | B1 | 19 | C1 | 45 | D1 | 0.75 |
| 20 | Invention Example 10 | A1 | 12 | B1 | 19 | C1 | 52 | D1 | 0.85 |
| 21 | Invention Example 11 | A1 | 4 | B1 | 11 | C1 | 68 | D1 | 1.1 |
| 22 | Comparative Example 11 | A1 | 1 | B1 | 10 | C1 | 72 | D1 | 1.2 |
| 23 | Comparative Example 12 | A1 | 4 | B1 | 16 | C1 | 60 | D1 | 0.8 |
| 24 | Invention Example 12 | A1 | 4 | B1 | 16 | C1 | 60 | D1 | 0.88 |
| 25 | Invention Example 13 | A1 | 4 | B1 | 16 | C1 | 60 | D1 | 1.15 |
| 26 | Comparative Example 13 | A1 | 4 | B1 | 16 | C1 | 60 | D1 | 1.25 |
| 27 | Comparative Example 14 | A1 | 4 | B1 | 16 | C1 | 60 | D1 | 1 |
| 28 | Invention Example 14 | A1 | 4 | B1 | 16 | C1 | 60 | D1 | 1 |
| 29 | Invention Example 15 | A1 | 4 | B1 | 16 | C1 | 60 | D1 | 1 |
| 30 | Comparative Example 15 | A1 | 4 | B1 | 16 | C1 | 60 | D1 | 1 |
| 31 | Invention Example 16 | A1 | 4 | B1 | 16 | C1 | 60 | D1 | 1 |
| 32 | Comparative Example 16 | A1 | 4 | B1 | 16 | C1 | 60 | D1 | 1 |

TABLE 10-1-continued

| | | (E) | | (F) | | (G) | | (W) | |
|---|---|---|---|---|---|---|---|---|---|
| No. | Type Table 5 | Equivalent V Mass % | Type Table 6 | Equivalent Mo Mass % | Type Table 7 | Equivalent F Mass % | Type Table 8 | | Solid mass content Mass % |
| 1 | E1 | 0.4 | F2 | 0.6 | G4 | 4 | — | | 0 |
| 2 | E1 | 0.4 | F2 | 0.6 | G4 | 4 | — | | 0 |
| 3 | E1 | 0.4 | F2 | 0.6 | G4 | 4 | — | | 0 |
| 4 | E1 | 0.4 | F2 | 0.6 | G4 | 4 | — | | 0 |
| 5 | E1 | 0.4 | F2 | 0.6 | G4 | 4 | — | | 0 |
| 6 | E1 | 0.4 | F2 | 0.6 | G4 | 4 | — | | 0 |
| 7 | E1 | 0.4 | F2 | 0.6 | G4 | 4 | — | | 0 |
| 8 | E1 | 0.4 | F2 | 0.6 | G4 | 4 | — | | 0 |
| 9 | E1 | 0.4 | F2 | 0.6 | G4 | 4 | — | | 0 |
| 10 | — | 0 | F2 | 0.6 | G4 | 4 | — | | 0 |
| 11 | E4 | 0.4 | F2 | 0.6 | G4 | 4 | — | | 0 |
| 12 | — | 0 | F2 | 0.6 | G4 | 4 | — | | 0 |
| 13 | — | 0 | F2 | 0.6 | G4 | 4 | — | | 0 |
| 14 | E1 | 0.4 | F2 | 0.6 | G4 | 4 | — | | 0 |
| 15 | E2 | 0.4 | F2 | 0.6 | G4 | 4 | — | | 0 |
| 16 | E3 | 0.4 | F2 | 0.6 | G4 | 4 | — | | 0 |
| 17 | E2 | 0.4 | F2 | 0.6 | G4 | 4 | — | | 0 |
| 18 | E2 | 0.4 | F2 | 0.6 | G4 | 4 | — | | 0 |
| 19 | E2 | 0.3 | F2 | 0.6 | G4 | 4 | — | | 0 |
| 20 | E2 | 0.34 | F2 | 0.6 | G4 | 4 | — | | 0 |
| 21 | E2 | 0.44 | F2 | 0.6 | G4 | 4 | — | | 0 |
| 22 | E2 | 0.48 | F2 | 0.6 | G4 | 4 | — | | 0 |
| 23 | E2 | 0.32 | F2 | 0.6 | G4 | 4 | — | | 0 |
| 24 | E2 | 0.35 | F2 | 0.6 | G4 | 4 | — | | 0 |
| 25 | E2 | 0.46 | F2 | 0.6 | G4 | 4 | — | | 0 |
| 26 | E2 | 0.5 | F2 | 0.6 | G4 | 4 | — | | 0 |
| 27 | E2 | 0.24 | F2 | 0.6 | G4 | 4 | — | | 0 |
| 28 | E2 | 0.33 | F2 | 0.6 | G4 | 4 | — | | 0 |
| 29 | E2 | 0.49 | F2 | 0.6 | G4 | 4 | — | | 0 |
| 30 | E2 | 0.55 | F2 | 0.6 | G4 | 4 | — | | 0 |
| 31 | E2 | 0.4 | F2 | 0.3 | G4 | 4 | — | | 0 |
| 32 | E2 | 0.4 | F2 | 0.1 | G4 | 4 | — | | 0 |

(A): Resin compound having a bisphenol skeleton, (B): Cationic Urethane resin emulsion, (C): Silane coupling agent, (D): Organic titanium chelate compound, (E): Quadrivalent vanadyl compound, (F): Molybdate compound, (G): Fluorine compound, (W): Wax emulsion

TABLE 10-2

| No. | | Others | | pH | (X1) | (X2) | (X3) | (X4) | (X5) | (X6) | (X7) |
|---|---|---|---|---|---|---|---|---|---|---|---|
| | | Type | Mass % | | | | | | | | |
| 1 | Invention Example 1 | Orthophosphoric acid | 3 | 4.5 | 0.20 | 0.75 | 60 | 0.40 | 0.008 | 0.050 | 0 |
| 2 | Invention Example 2 | Orthophosphoric acid | 3 | 4.5 | 0.13 | 0.75 | 60 | 0.40 | 0.008 | 0.050 | 0 |
| 3 | Invention Example 3 | Orthophosphoric acid | 3 | 4.5 | 0.11 | 0.75 | 60 | 0.40 | 0.008 | 0.050 | 0 |
| 4 | Comparative Example 1 | Orthophosphoric acid | 3 | 4.5 | 0.08 | 0.75 | 60 | 0.40 | 0.008 | 0.050 | 0 |
| 5 | Invention Example 4 | Orthophosphoric acid | 3 | 4.5 | 0.27 | 0.73 | 58 | 0.40 | 0.008 | 0.050 | 0 |
| 6 | Invention Example 5 | Orthophosphoric acid | 3 | 4.5 | 0.29 | 0.70 | 56 | 0.40 | 0.008 | 0.050 | 0 |
| 7 | Comparative Example 2 | Orthophosphoric acid | 3 | 4.5 | 0.32 | 0.68 | 55 | 0.40 | 0.007 | 0.049 | 0 |
| 8 | Comparative Example 3 | Orthophosphoric acid | 3 | 4.5 | 0.20 | 0.75 | 60 | 0.40 | 0.008 | 0.050 | 0 |
| 9 | Comparative Example 4 | Orthophosphoric acid | 3 | 4.5 | 0.20 | 0.75 | 60 | 0.40 | 0.008 | 0.050 | 0 |
| 10 | Comparative Example 5 | Orthophosphoric acid | 3 | 4.5 | 0.20 | 0.75 | 60 | 0.00 | 0.008 | 0.050 | 0 |
| 11 | Comparative Example 6 | Orthophosphoric acid | 3 | 4.5 | 0.20 | 0.75 | 60 | 0.40 | 0.008 | 0.050 | 0 |
| 12 | Comparative Example 7 | Nitric acid | 10 | 4.5 | 0.06 | 0.65 | 57 | 0.00 | 0.006 | 0.040 | 0 |
| 13 | Comparative Example 8 | Orthophosphoric acid | 10 | 4.5 | 0.06 | 0.65 | 57 | 0.00 | 0.006 | 0.040 | 0 |
| 14 | Comparative Example 9 | Orthophosphoric acid | 6 | 4.5 | 0.50 | 0.25 | 20 | 0.40 | 0.008 | 0.050 | 0 |
| 15 | Invention Example 6 | Orthophosphoric acid | 3 | 4.5 | 0.20 | 0.75 | 60 | 0.40 | 0.008 | 0.050 | 0 |
| 16 | Invention Example 7 | Orthophosphoric acid | 3 | 4.5 | 0.20 | 0.75 | 60 | 0.40 | 0.008 | 0.050 | 0 |
| 17 | Invention Example 8 | Orthophosphoric acid | 3 | 4.5 | 0.20 | 0.75 | 60 | 0.40 | 0.008 | 0.050 | 0 |
| 18 | Invention Example 9 | Orthophosphoric acid | 3 | 4.5 | 0.23 | 0.72 | 55 | 0.36 | 0.007 | 0.048 | 0 |
| 19 | Comparative Example 10 | Orthophosphoric acid | 3 | 4.5 | 0.23 | 0.54 | 60 | 0.40 | 0.007 | 0.048 | 0 |
| 20 | Invention Example 10 | Orthophosphoric acid | 3 | 4.5 | 0.23 | 0.63 | 61 | 0.40 | 0.007 | 0.048 | 0 |
| 21 | Invention Example 11 | Orthophosphoric acid | 3 | 4.5 | 0.13 | 0.82 | 62 | 0.40 | 0.007 | 0.048 | 0 |
| 22 | Comparative Example 11 | Orthophosphoric acid | 3 | 4.5 | 0.12 | 0.87 | 60 | 0.40 | 0.007 | 0.048 | 0 |
| 23 | Comparative Example 12 | Orthophosphoric acid | 3 | 4.5 | 0.20 | 0.75 | 75 | 0.40 | 0.008 | 0.050 | 0 |
| 24 | Invention Example 12 | Orthophosphoric acid | 3 | 4.5 | 0.20 | 0.75 | 68 | 0.40 | 0.008 | 0.050 | 0 |
| 25 | Invention Example 13 | Orthophosphoric acid | 3 | 4.5 | 0.20 | 0.75 | 52 | 0.40 | 0.008 | 0.050 | 0 |
| 26 | Comparative Example 13 | Orthophosphoric acid | 3 | 4.5 | 0.20 | 0.75 | 48 | 0.40 | 0.008 | 0.050 | 0 |
| 27 | Comparative Example 14 | Orthophosphoric acid | 3 | 4.5 | 0.20 | 0.75 | 60 | 0.24 | 0.008 | 0.050 | 0 |
| 28 | Invention Example 14 | Orthophosphoric acid | 3 | 4.5 | 0.20 | 0.75 | 60 | 0.33 | 0.008 | 0.050 | 0 |
| 29 | Invention Example 15 | Orthophosphoric acid | 3 | 4.5 | 0.20 | 0.75 | 60 | 0.49 | 0.008 | 0.050 | 0 |

TABLE 10-2-continued

| | | Others | | | | | | | | | |
|---|---|---|---|---|---|---|---|---|---|---|---|
| No. | | Type | Mass % | pH | (X1) | (X2) | (X3) | (X4) | (X5) | (X6) | (X7) |
| 30 | Comparative Example 15 | Orthophosphoric acid | 3 | 4.5 | 0.20 | 0.75 | 60 | 0.55 | 0.008 | 0.050 | 0 |
| 31 | Invention Example 16 | Orthophosphoric acid | 3 | 4.5 | 0.20 | 0.75 | 60 | 0.40 | 0.004 | 0.050 | 0 |
| 32 | Comparative Example 16 | Orthophosphoric acid | 3 | 4.5 | 0.20 | 0.75 | 60 | 0.40 | 0.001 | 0.050 | 0 |

(*) $X1 = (B_s)/(A_s + B_s + C_s)$, $X2 = (C_s)/(A_s + B_s + C_s)$, $X3 = (C_s)/(D_{Ti})$, $X4 = (E_V)/(D_{Ti})$, $X5 = (F_{Mo})/(A_s + B_s + C_s)$, $X6 = (G_F)/(A_s + B_s + C_s)$, $X7 = (W_s)/(A_s + B_s)$

TABLE 11-1

| | | (A) | | (B) | | (C) | | (D) | |
|---|---|---|---|---|---|---|---|---|---|
| | | | Solid | | Solid | | Solid | | |
| | | | mass | | mass | | mass | | Equivalent |
| | | Type | content | Type | content | Type | content | Type | Ti |
| No. | | Table 1 | Mass % | Table 2 | Mass % | Table 3 | Mass % | Table 4 | Mass % |
| 33 | Comparative Example 17 | A1 | 4 | B1 | 16 | C1 | 60 | D1 | 1 |
| 34 | Comparative Example 18 | A1 | 4 | B1 | 16 | C1 | 60 | D1 | 1 |
| 35 | Invention Example 17 | A1 | 4 | B1 | 16 | C1 | 60 | D1 | 1 |
| 36 | Invention Example 18 | A1 | 4 | B1 | 16 | C1 | 60 | D1 | 1 |
| 37 | Comparative Example 19 | A1 | 4 | B1 | 16 | C1 | 60 | D1 | 1 |
| 38 | Invention Example 19 | A1 | 4 | B1 | 16 | C1 | 60 | D1 | 1 |
| 39 | Comparative Example 20 | A1 | 4 | B1 | 16 | C1 | 60 | D1 | 1 |
| 40 | Invention Example 20 | A1 | 4 | B1 | 16 | C1 | 60 | D1 | 1 |
| 41 | Invention Example 21 | A1 | 4 | B1 | 16 | C1 | 60 | D1 | 1 |
| 42 | Invention Example 22 | A1 | 4 | B1 | 16 | C1 | 60 | D1 | 1 |
| 43 | Invention Example 23 | A1 | 4 | B1 | 16 | C1 | 60 | D1 | 1 |
| 44 | Invention Example 24 | A1 | 4 | B1 | 16 | C1 | 60 | D1 | 1 |
| 45 | Invention Example 25 | A1 | 4 | B1 | 16 | C1 | 60 | D1 | 1 |
| 46 | Invention Example 26 | A1 | 4 | B1 | 16 | C1 | 60 | D1 | 1 |
| 47 | Invention Example 27 | A1 | 4 | B1 | 16 | C1 | 60 | D1 | 1 |
| 48 | Comparative Example 21 | A1 | 4 | B1 | 16 | C1 | 60 | D1 | 1 |
| 49 | Comparative Example 22 | A1 | 4 | B1 | 16 | C1 | 60 | D1 | 1 |
| 50 | Invention Example 28 | A1 | 4 | B1 | 16 | C1 | 60 | D1 | 1 |
| 51 | Invention Example 29 | A1 | 4 | B1 | 16 | C1 | 60 | D1 | 1 |
| 52 | Comparative Example 23 | A1 | 4 | B1 | 16 | C1 | 60 | D1 | 1 |
| 53 | Comparative Example 24 | A1 | 4 | B1 | 16 | C1 | 60 | D1 | 1 |
| 54 | Comparative Example 25 | A1 | 4 | B1 | 16 | C1 | 60 | D1 | 1 |
| 55 | Invention Example 30 | A1 | 4 | B1 | 16 | C1 | 60 | D1 | 1 |
| 56 | Invention Example 31 | A1 | 4 | B1 | 16 | C1 | 60 | D1 | 1 |
| 57 | Invention Example 32 | A1 | 4 | B1 | 16 | C1 | 60 | D1 | 1 |
| 58 | Invention Example 33 | A1 | 4 | B1 | 16 | C1 | 60 | D1 | 1 |
| 59 | Comparative Example 26 | A1 | 4 | B1 | 16 | C1 | 60 | D1 | 1 |
| 60 | Comparative Example 27 | A1 | 4 | B1 | 16 | C1 | 60 | D1 | 1 |
| 61 | Invention Example 34 | A1 | 4 | B1 | 16 | C1 | 60 | D1 | 1 |
| 62 | Invention Example 35 | A1 | 4 | B1 | 16 | C1 | 60 | D1 | 1 |
| 63 | Comparative Example 28 | A1 | 4 | B1 | 16 | C1 | 60 | D1 | 1 |

| | (E) | | (F) | | (G) | | (W) | |
|---|---|---|---|---|---|---|---|---|
| | | Equivalent | | Equivalent | | Equivalent | | Solid |
| | Type | V | Type | Mo | Type | F | Type | mass content |
| No. | Table 5 | Mass % | Table 6 | Mass % | Table 7 | Mass % | Table 8 | Mass % |
| 33 | E2 | 0.4 | — | 0 | G4 | 4 | — | 0 |
| 34 | E2 | 0.4 | F2 | 2.6 | G4 | 4 | — | 0 |
| 35 | E2 | 0.4 | F2 | 0.6 | G4 | 4 | — | 0 |
| 36 | E2 | 0.4 | F2 | 0.1 | G4 | 1.5 | — | 0 |
| 37 | E2 | 0.4 | — | 0 | G4 | 0.5 | — | 0 |
| 38 | E2 | 0.4 | F2 | 0.6 | G4 | 7 | — | 0 |
| 39 | E2 | 0.4 | F2 | 0.6 | G4 | 10 | — | 0 |
| 40 | E2 | 0.4 | F2 | 0.6 | G1 | 4 | — | 0 |
| 41 | E2 | 0.4 | F2 | 0.6 | G2 | 4 | — | 0 |
| 42 | E2 | 0.4 | F2 | 0.6 | G3 | 4 | — | 0 |
| 43 | E2 | 0.4 | F2 | 0.6 | G5 | 4 | — | 0 |
| 44 | E2 | 0.4 | F2 | 0.6 | G4 | 4 | W1 | 6.1 |
| 45 | E2 | 0.4 | F2 | 0.6 | G4 | 4 | W2 | 7.8 |
| 46 | E2 | 0.4 | F2 | 0.6 | G4 | 4 | W3 | 6.1 |
| 47 | E2 | 0.4 | F2 | 0.6 | G4 | 4 | W1 | 5.0 |
| 48 | E1 | 0.4 | F1 | 0.6 | G4 | 4 | — | 0 |
| 49 | E1 | 0.4 | F1 | 0.6 | G4 | 4 | — | 0 |
| 50 | E1 | 0.4 | F1 | 0.6 | G4 | 4 | — | 0 |

TABLE 11-1-continued

| | | | | | | | | | |
|---|---|---|---|---|---|---|---|---|---|
| 51 | E1 | 0.4 | F1 | 0.6 | G4 | 4 | — | 0 | |
| 52 | E1 | 0.4 | F1 | 0.6 | G4 | 4 | — | 0 | |
| 53 | E1 | 0.4 | F1 | 0.6 | G4 | 4 | — | 0 | |
| 54 | E1 | 0.4 | F1 | 0.6 | G1 | 4 | — | 0 | |
| 55 | E1 | 0.4 | F1 | 0.6 | G1 | 4 | — | 0 | |
| 56 | E1 | 0.4 | F1 | 0.6 | G1 | 4 | — | 0 | |
| 57 | E1 | 0.4 | F1 | 0.6 | G1 | 4 | — | 0 | |
| 58 | E1 | 0.4 | F1 | 0.6 | G1 | 4 | — | 0 | |
| 59 | E1 | 0.4 | F1 | 0.6 | G1 | 4 | — | 0 | |
| 60 | E1 | 0.4 | F1 | 0.6 | G1 | 4 | — | 0 | |
| 61 | E1 | 0.4 | F1 | 0.6 | G1 | 4 | — | 0 | |
| 62 | E1 | 0.4 | F1 | 0.6 | G1 | 4 | — | 0 | |
| 63 | E1 | 0.4 | F1 | 0.6 | G1 | 4 | — | 0 | |

(A): Resin compound having a bisphenol skeleton, (B): Cationic Urethane resin emulsion, (C): Silane coupling agent, (D): Organic titanium chelate compound, (E): Quadrivalent vanadyl compound, (F): Molybdate compound, (G): Fluorine compound, (W): Wax emulsion

TABLE 11-2

| No. | | Others Type | Mass % | pH | (X1) | (X2) | (X3) | (X4) | (X5) | (X6) | (X7) |
|---|---|---|---|---|---|---|---|---|---|---|---|
| 33 | Comparative Example 17 | Orthophosphoric acid | 3 | 4.5 | 0.20 | 0.75 | 60 | 0.40 | 0 | 0.050 | 0 |
| 34 | Comparative Example 18 | Orthophosphoric acid | 3 | 4.5 | 0.20 | 0.75 | 60 | 0.40 | 0.033 | 0.050 | 0 |
| 35 | Invention Example 17 | Orthophosphoric acid | 3 | 4.5 | 0.20 | 0.75 | 60 | 0.40 | 0.008 | 0.050 | 0 |
| 36 | Invention Example 18 | Orthophosphoric acid | 3 | 4.5 | 0.20 | 0.75 | 60 | 0.40 | 0.001 | 0.019 | 0 |
| 37 | Comparative Example 19 | Orthophosphoric acid | 3 | 4.5 | 0.20 | 0.75 | 60 | 0.40 | 0 | 0.006 | 0 |
| 38 | Invention Example 19 | Orthophosphoric acid | 3 | 4.5 | 0.20 | 0.75 | 60 | 0.40 | 0.008 | 0.088 | 0 |
| 39 | Comparative Example 20 | Orthophosphoric acid | 3 | 4.5 | 0.20 | 0.75 | 60 | 0.40 | 0.008 | 0.125 | 0 |
| 40 | Invention Example 20 | Orthophosphoric acid | 3 | 4.5 | 0.20 | 0.75 | 60 | 0.40 | 0.008 | 0.050 | 0 |
| 41 | Invention Example 21 | Orthophosphoric acid | 3 | 4.5 | 0.20 | 0.75 | 60 | 0.40 | 0.008 | 0.050 | 0 |
| 42 | Invention Example 22 | Orthophosphoric acid | 3 | 4.5 | 0.20 | 0.75 | 60 | 0.40 | 0.008 | 0.050 | 0 |
| 43 | Invention Example 23 | Orthophosphoric acid | 3 | 4.5 | 0.20 | 0.75 | 60 | 0.40 | 0.008 | 0.050 | 0 |
| 44 | Invention Example 24 | Orthophosphoric acid | 3 | 4.5 | 0.20 | 0.75 | 60 | 0.40 | 0.008 | 0.050 | 0.31 |
| 45 | Invention Example 25 | Orthophosphoric acid | 3 | 4.5 | 0.20 | 0.75 | 60 | 0.40 | 0.008 | 0.050 | 0.39 |
| 46 | Invention Example 26 | Orthophosphoric acid | 3 | 4.5 | 0.20 | 0.75 | 60 | 0.40 | 0.008 | 0.050 | 0.31 |
| 47 | Invention Example 27 | Orthophosphoric acid | 3 | 4.5 | 0.20 | 0.75 | 60 | 0.40 | 0.008 | 0.050 | 0.25 |
| 48 | Comparative Example 21 | Orthophosphoric acid | 3 | 3.0 | 0.20 | 0.75 | 60 | 0.40 | 0.008 | 0.050 | 0 |
| 49 | Comparative Example 22 | Orthophosphoric acid | 3 | 3.4 | 0.20 | 0.75 | 60 | 0.40 | 0.008 | 0.050 | 0 |
| 50 | Invention Example 28 | Orthophosphoric acid | 3 | 4.0 | 0.20 | 0.75 | 60 | 0.40 | 0.008 | 0.050 | 0 |
| 51 | Invention Example 29 | Orthophosphoric acid | 3 | 5.0 | 0.20 | 0.75 | 60 | 0.40 | 0.008 | 0.050 | 0 |
| 52 | Comparative Example 23 | Orthophosphoric acid | 3 | 5.5 | 0.20 | 0.75 | 60 | 0.40 | 0.008 | 0.050 | 0 |
| 53 | Comparative Example 24 | Orthophosphoric acid | 3 | 6.0 | 0.20 | 0.75 | 60 | 0.40 | 0.008 | 0.050 | 0 |
| 54 | Comparative Example 25 | Orthophosphoric acid | 3 | 4.5 | 0.20 | 0.75 | 60 | 0.40 | 0.008 | 0.050 | 0 |
| 55 | Invention Example 30 | Orthophosphoric acid | 3 | 4.5 | 0.20 | 0.75 | 60 | 0.40 | 0.008 | 0.050 | 0 |
| 56 | Invention Example 31 | Orthophosphoric acid | 3 | 4.5 | 0.20 | 0.75 | 60 | 0.40 | 0.008 | 0.050 | 0 |
| 57 | Invention Example 32 | Orthophosphoric acid | 3 | 4.5 | 0.20 | 0.75 | 60 | 0.40 | 0.008 | 0.050 | 0 |
| 58 | Invention Example 33 | Orthophosphoric acid | 3 | 4.5 | 0.20 | 0.75 | 60 | 0.40 | 0.008 | 0.050 | 0 |
| 59 | Comparative Example 26 | Orthophosphoric acid | 3 | 4.5 | 0.20 | 0.75 | 60 | 0.40 | 0.008 | 0.050 | 0 |
| 60 | Comparative Example 27 | Orthophosphoric acid | 3 | 4.5 | 0.20 | 0.75 | 60 | 0.40 | 0.008 | 0.050 | 0 |
| 61 | Invention Example 34 | Orthophosphoric acid | 3 | 4.5 | 0.20 | 0.75 | 60 | 0.40 | 0.008 | 0.050 | 0 |
| 62 | Invention Example 35 | Orthophosphoric acid | 3 | 4.5 | 0.20 | 0.75 | 60 | 0.40 | 0.008 | 0.050 | 0 |
| 63 | Comparative Example 28 | Orthophosphoric acid | 3 | 4.5 | 0.20 | 0.75 | 60 | 0.40 | 0.008 | 0.050 | 0 |

(*) $X1 = (B_s)/(A_s + B_s + C_s)$, $X2 = (C_s)/(A_s + B_s + C_s)$, $X3 = (C_s)/(D_{Ti})$, $X4 = (E_V)/(D_{Ti})$, $X5 = (F_{Mo})/(A_s + B_s + C_s)$, $X6 = (G_F)/(A_s + B_s + C_s)$, $X7 = (W_s)/(A_s + B_s)$

TABLE 12-1

| No. | | (A) Type Table 1 | Solid mass content Mass % | (B) Type Table 2 | Solid mass content Mass % | (C) Type Table 3 | Solid mass content Mass % | (D) Type Table 4 | Equivalent Ti Mass % |
|---|---|---|---|---|---|---|---|---|---|
| 64 | Invention Example 36 | A4 | 4 | B1 | 16 | C1 | 60 | D1 | 1 |
| 65 | Comparative Example 29 | A5 | 4 | B1 | 16 | C1 | 60 | D1 | 1 |
| 66 | Comparative Example 30 | A6 | 4 | B1 | 16 | C1 | 60 | D1 | 1 |
| 67 | Comparative Example 31 | A7 | 4 | B1 | 16 | C1 | 60 | D1 | 1 |
| 68 | Comparative Example 32 | A8 | 4 | B1 | 16 | C1 | 60 | D1 | 1 |
| 69 | Comparative Example 33 | A9 | 4 | B1 | 16 | C1 | 60 | D1 | 1 |
| 70 | Invention Example 37 | A10 | 4 | B1 | 16 | C1 | 60 | D1 | 0.94 |
| 71 | Invention Example 38 | A11 | 4 | B1 | 16 | C1 | 60 | D1 | 1 |
| 72 | Invention Example 39 | A12 | 10 | B1 | 10 | C1 | 60 | D1 | 1 |
| 73 | Invention Example 40 | A13 | 4 | B1 | 16 | C1 | 50 | D1 | 1 |

TABLE 12-1-continued

| | | | | | | | | | | |
|---|---|---|---|---|---|---|---|---|---|---|
| 74 | Comparative Example 34 | A14 | 4 | B1 | 16 | C1 | 60 | D1 | 1 |
| 75 | Comparative Example 35 | A15 | 4 | B1 | 16 | C1 | 60 | D1 | 1 |
| 76 | Comparative Example 36 | A16 | 4 | B1 | 16 | C1 | 60 | D1 | 1 |
| 77 | Comparative Example 37 | A17 | 4 | B1 | 16 | C1 | 60 | D1 | 1 |
| 78 | Comparative Example 38 | A18 | 4 | B1 | 16 | C1 | 60 | D1 | 1 |
| 79 | Invention Example 41 | A1 | 4 | B2 | 16 | C1 | 60 | D1 | 1 |
| 80 | Invention Example 42 | A1 | 4 | B3 | 16 | C1 | 60 | D1 | 1.07 |
| 81 | Comparative Example 39 | A1 | 4 | B4 | 16 | C1 | 60 | D1 | 1 |
| 82 | Comparative Example 40 | A1 | 4 | B5 | 16 | C1 | 60 | D1 | 1 |
| 83 | Invention Example 43 | A1 | 4 | B1 | 16 | C4 | 64 | D1 | 1 |
| 84 | Comparative Example 41 | A1 | 4 | B1 | 16 | C5 | 60 | D1 | 1 |
| 85 | Invention Example 44 | A1 | 4 | B1 | 16 | C1 | 60 | D1 | 1 |
| 86 | Invention Example 45 | A1 | 4 | B1 | 16 | C1 | 60 | D1 | 1 |
| 87 | Invention Example 45 | A1 | 4 | B1 | 16 | C1 | 60 | D1 | 1 |
| 88 | Invention Example 46 | A1 | 4 | B1 | 16 | C1 | 60 | D1 | 1 |

| | (E) | | (F) | | (G) | | | (W) |
|---|---|---|---|---|---|---|---|---|
| No. | Type Table 5 | Equivalent V Mass % | Type Table 6 | Equivalent Mo Mass % | Type Table 7 | Equivalent F Mass % | Type Table 8 | Solid mass content Mass % |
| 64 | E1 | 0.4 | F1 | 0.6 | G1 | 4 | — | 0 |
| 65 | E1 | 0.4 | F1 | 0.6 | G1 | 4 | — | 0 |
| 66 | E1 | 0.4 | F1 | 0.6 | G1 | 4 | — | 0 |
| 67 | E1 | 0.4 | F1 | 0.6 | G1 | 4 | — | 0 |
| 68 | E1 | 0.4 | F1 | 0.6 | G1 | 4 | — | 0 |
| 69 | E1 | 0.4 | F1 | 0.6 | G1 | 4 | — | 0 |
| 70 | E1 | 0.4 | F1 | 0.6 | G1 | 4 | — | 0 |
| 71 | E1 | 0.4 | F1 | 0.6 | G1 | 4 | — | 0 |
| 72 | E1 | 0.4 | F1 | 0.6 | G1 | 4 | — | 0 |
| 73 | E1 | 0.4 | F1 | 0.6 | G1 | 4 | — | 0 |
| 74 | E1 | 0.4 | F1 | 0.6 | G1 | 4 | — | 0 |
| 75 | E1 | 0.4 | F1 | 0.6 | G1 | 4 | — | 0 |
| 76 | E1 | 0.4 | F1 | 0.6 | G1 | 4 | — | 0 |
| 77 | E1 | 0.4 | F1 | 0.6 | G1 | 4 | — | 0 |
| 78 | E1 | 0.4 | F1 | 0.6 | G1 | 4 | — | 0 |
| 79 | E1 | 0.4 | F1 | 0.6 | G1 | 4 | — | 0 |
| 80 | E1 | 0.4 | F1 | 0.6 | G1 | 4 | — | 0 |
| 81 | E1 | 0.4 | F1 | 0.6 | G1 | 4 | — | 0 |
| 82 | E1 | 0.4 | F1 | 0.6 | G1 | 4 | — | 0 |
| 83 | E1 | 0.4 | F1 | 0.6 | G1 | 4 | — | 0 |
| 84 | E1 | 0.4 | F1 | 0.6 | G1 | 4 | — | 0 |
| 85 | E2 | 0.4 | F2 | 0.6 | G4 | 4 | — | 0 |
| 86 | E2 | 0.4 | F2 | 0.6 | G4 | 4 | — | 0 |
| 87 | E2 | 0.4 | F2 | 0.6 | G4 | 4 | — | 0 |
| 88 | E2 | 0.4 | F2 | 0.6 | G4 | 4 | — | 0 |

(A): Resin compound having a bisphenol skeleton, (B): Cationic Urethane resin emulsion, (C): Silane coupling agent, (D): Organic titanium chelate compound, (E): Quadrivalent vanadyl compound, (F): Molybdate compound, (G): Fluorine compound, (W): Wax emulsion

TABLE 12-2

| | | Others | | | | | | | | | |
|---|---|---|---|---|---|---|---|---|---|---|---|
| No. | | Type | Mass % | pH | (X1) | (X2) | (X3) | (X4) | (X5) | (X6) | (X7) |
| 64 | Invention Example 36 | Orthophosphoric acid | 3 | 4.5 | 0.20 | 0.75 | 60 | 0.40 | 0.0075 | 0.050 | 0 |
| 65 | Comparative Example 29 | Orthophosphoric acid | 3 | 4.5 | 0.20 | 0.75 | 60 | 0.40 | 0.0075 | 0.050 | 0 |
| 66 | Comparative Example 30 | Orthophosphoric acid | 3 | 4.5 | 0.20 | 0.75 | 60 | 0.40 | 0.0075 | 0.050 | 0 |
| 67 | Comparative Example 31 | Orthophosphoric acid | 3 | 4.5 | 0.20 | 0.75 | 60 | 0.40 | 0.0075 | 0.050 | 0 |
| 68 | Comparative Example 32 | Orthophosphoric acid | 3 | 4.5 | 0.20 | 0.75 | 60 | 0.40 | 0.0075 | 0.050 | 0 |
| 69 | Comparative Example 33 | Orthophosphoric acid | 3 | 4.5 | 0.20 | 0.75 | 60 | 0.40 | 0.0075 | 0.050 | 0 |
| 70 | Invention Example 37 | Orthophosphoric acid | 3 | 4.5 | 0.20 | 0.75 | 64 | 0.43 | 0.0075 | 0.050 | 0 |
| 71 | Invention Example 38 | Orthophosphoric acid | 3 | 4.5 | 0.20 | 0.75 | 60 | 0.40 | 0.0075 | 0.050 | 0 |
| 72 | Invention Example 39 | Orthophosphoric acid | 3 | 4.5 | 0.13 | 0.75 | 60 | 0.40 | 0.0075 | 0.050 | 0 |
| 73 | Invention Example 40 | Orthophosphoric acid | 3 | 4.5 | 0.23 | 0.71 | 50 | 0.40 | 0.0075 | 0.057 | 0 |
| 74 | Comparative Example 34 | Orthophosphoric acid | 3 | 4.5 | 0.20 | 0.75 | 60 | 0.40 | 0.0075 | 0.050 | 0 |
| 75 | Comparative Example 35 | Orthophosphoric acid | 3 | 4.5 | 0.20 | 0.75 | 60 | 0.40 | 0.0075 | 0.050 | 0 |
| 76 | Comparative Example 36 | Orthophosphoric acid | 3 | 4.5 | 0.20 | 0.75 | 60 | 0.40 | 0.0075 | 0.050 | 0 |
| 77 | Comparative Example 37 | Orthophosphoric acid | 3 | 4.5 | 0.20 | 0.75 | 60 | 0.40 | 0.0075 | 0.050 | 0 |
| 78 | Comparative Example 38 | Orthophosphoric acid | 3 | 4.5 | 0.20 | 0.75 | 60 | 0.40 | 0.0075 | 0.050 | 0 |
| 79 | Invention Example 41 | Orthophosphoric acid | 3 | 4.5 | 0.20 | 0.75 | 60 | 0.40 | 0.0075 | 0.050 | 0 |
| 80 | Invention Example 42 | Orthophosphoric acid | 3 | 4.5 | 0.20 | 0.75 | 56 | 0.37 | 0.0075 | 0.050 | 0 |
| 81 | Comparative Example 39 | Orthophosphoric acid | 3 | 4.5 | 0.20 | 0.75 | 60 | 0.40 | 0.0075 | 0.050 | 0 |
| 82 | Comparative Example 40 | Orthophosphoric acid | 3 | 4.5 | 0.20 | 0.75 | 60 | 0.40 | 0.0075 | 0.050 | 0 |
| 83 | Invention Example 43 | Orthophosphoric acid | 3 | 4.5 | 0.19 | 0.76 | 64 | 0.40 | 0.0075 | 0.048 | 0 |

TABLE 12-2-continued

| No. | Others Type | Mass % | pH | (X1) | (X2) | (X3) | (X4) | (X5) | (X6) | (X7) |
|---|---|---|---|---|---|---|---|---|---|---|
| 84 | Comparative Example 41 | Orthophosphoric acid | 3 | 4.5 | 0.20 | 0.75 | 60 | 0.40 | 0.0075 | 0.050 | 0 |
| 85 | Invention Example 44 | Orthophosphoric acid | 3 | 4.5 | 0.20 | 0.75 | 60 | 0.40 | 0.008 | 0.050 | 0 |
| 86 | Invention Example 45 | Orthophosphoric acid | 3 | 4.5 | 0.20 | 0.75 | 60 | 0.40 | 0.008 | 0.050 | 0 |
| 87 | Invention Example 45 | Orthophosphoric acid | 3 | 4.5 | 0.20 | 0.75 | 60 | 0.40 | 0.008 | 0.050 | 0 |
| 88 | Invention Example 46 | Orthophosphoric acid | 3 | 4.5 | 0.20 | 0.75 | 60 | 0.40 | 0.008 | 0.050 | 0 |

(*) $X1 = (B_s)/(A_s + B_s + C_s)$, $X2 = (C_s)/(A_s + B_s + C_s)$, $X3 = (C_s)/(D_{Ti})$, $X4 = (E_V)/(D_{Ti})$, $X5 = (F_{Mo})/(A_s + B_s + C_s)$, $X6 = (G_F)/(A_s + B_s + C_s)$, $X7 = (W_s)/(A_s + B_s)$

TABLE 13

| No. | Coated steel sheet | Drying temperature ° C. | Coating amount g/m² | Remarks |
|---|---|---|---|---|
| 1 Invention Example 1 | GF1 | 100 | 1.0 | |
| 2 Invention Example 2 | GF1 | 100 | 1.0 | |
| 3 Invention Example 3 | GF1 | 100 | 1.0 | |
| 4 Comparative Example 1 | GF1 | 100 | 1.0 | |
| 5 Invention Example 4 | GF1 | 100 | 1.0 | |
| 6 Invention Example 5 | GF1 | 100 | 1.0 | |
| 7 Comparative Example 2 | GF1 | 100 | 1.0 | |
| 8 Comparative Example 3 | GF1 | 100 | 1.0 | |
| 9 Comparative Example 4 | GF1 | 100 | 1.0 | |
| 10 Comparative Example 5 | GF1 | 100 | 1.0 | |
| 11 Comparative Example 6 | GF1 | 100 | 1.0 | |
| 12 Comparative Example 7 | GF1 | 100 | 1.0 | Based on JP 3883831 |
| 13 Comparative Example 8 | GF1 | 100 | 1.0 | |
| 14 Comparative Example 9 | GF1 | 100 | 1.0 | Based on JP 2006-152436 |
| 15 Invention Example 6 | GF1 | 100 | 1.0 | |
| 16 Invention Example 7 | GF1 | 100 | 1.0 | |
| 17 Invention Example 8 | GF1 | 100 | 1.0 | |
| 18 Invention Example 9 | GF1 | 100 | 1.0 | |
| 19 Comparative Example 10 | GF1 | 100 | 1.0 | |
| 20 Invention Example 10 | GF1 | 100 | 1.0 | |
| 21 Invention Example 11 | GF1 | 100 | 1.0 | |
| 22 Comparative Example 11 | GF1 | 100 | 1.0 | |
| 23 Comparative Example 12 | GF1 | 100 | 1.0 | |
| 24 Invention Example 12 | GF1 | 100 | 1.0 | |
| 25 Invention Example 13 | GF1 | 100 | 1.0 | |
| 26 Comparative Example 13 | GF1 | 100 | 1.0 | |
| 27 Comparative Example 14 | GF1 | 100 | 1.0 | |
| 28 Invention Example 14 | GF1 | 100 | 1.0 | |
| 29 Invention Example 15 | GF1 | 100 | 1.0 | |
| 30 Comparative Example 15 | GF1 | 100 | 1.0 | |
| 31 Invention Example 16 | GF1 | 100 | 1.0 | |
| 32 Comparative Example 16 | GF1 | 100 | 1.0 | |
| 33 Comparative Example 17 | GF1 | 100 | 1.0 | |
| 34 Comparative Example 18 | GF1 | 100 | 1.0 | |
| 35 Invention Example 17 | GF1 | 100 | 1.0 | |
| 36 Invention Example 18 | GF1 | 100 | 1.0 | |
| 37 Comparative Example 19 | GF1 | 100 | 1.0 | |
| 38 Invention Example 19 | GF1 | 100 | 1.0 | |
| 39 Comparative Example 20 | GF1 | 100 | 1.0 | |
| 40 Invention Example 20 | GF1 | 100 | 1.0 | |
| 41 Invention Example 21 | GF1 | 100 | 1.0 | |
| 42 Invention Example 22 | GF1 | 100 | 1.0 | |
| 43 Invention Example 23 | GF1 | 100 | 1.0 | |
| 44 Invention Example 24 | GF1 | 100 | 1.0 | |
| 45 Invention Example 25 | GF1 | 100 | 1.0 | |
| 46 Invention Example 26 | GF1 | 100 | 1.0 | |
| 47 Invention Example 27 | GF1 | 100 | 1.0 | |
| 48 Comparative Example 21 | GF1 | 100 | 1.0 | |
| 49 Comparative Example 22 | GF1 | 100 | 1.0 | |
| 50 Invention Example 28 | GF1 | 100 | 1.0 | |
| 51 Invention Example 29 | GF1 | 100 | 1.0 | |
| 52 Comparative Example 23 | GF1 | 100 | 1.0 | |
| 53 Comparative Example 24 | GF1 | — | — | The test was quit because the surface treatment liquid was gelated |
| 54 Comparative Example 25 | GF1 | 100 | 0.1 | |
| 55 Invention Example 30 | GF1 | 100 | 0.3 | |
| 56 Invention Example 31 | GF1 | 100 | 0.5 | |
| 57 Invention Example 32 | GF1 | 100 | 1.3 | |
| 58 Invention Example 33 | GF1 | 100 | 1.5 | |
| 59 Comparative Example 26 | GF1 | 100 | 2.0 | |

TABLE 13-continued

| No. | | Coated steel sheet | Drying temperature ° C. | Coating amount g/m² | Remarks |
|---|---|---|---|---|---|
| 60 | Comparative Example 27 | GF1 | 40 | 1.0 | |
| 61 | Invention Example 34 | GF1 | 60 | 1.0 | |
| 62 | Invention Example 35 | GF1 | 140 | 1.0 | |
| 63 | Comparative Example 28 | GF1 | 220 | 1.0 | |
| 64 | Invention Example 36 | GF1 | 100 | 1.0 | |
| 65 | Comparative Example 29 | GF1 | — | — | The test was quit because some material remained undissolved |
| 66 | Comparative Example 30 | GF1 | — | — | The test was quit because some material remained undissolved |
| 67 | Comparative Example 31 | GF1 | — | — | The test was quit because some material remained undissolved |
| 68 | Comparative Example 32 | GF1 | 100 | 1.0 | |
| 69 | Comparative Example 33 | GF1 | 100 | 1.0 | |
| 70 | Invention Example 37 | GF1 | 100 | 1.0 | |
| 71 | Invention Example 38 | GF1 | 100 | 1.0 | |
| 72 | Invention Example 39 | GF1 | 100 | 1.0 | |
| 73 | Invention Example 40 | GF1 | 100 | 1.0 | |
| 74 | Comparative Example 34 | GF1 | — | — | The test was quit because some material remained undissolved |
| 75 | Comparative Example 35 | GF1 | — | — | The test was quit because some material remained undissolved |
| 76 | Comparative Example 36 | GF1 | — | — | The test was quit because some material remained undissolved |
| 77 | Comparative Example 37 | GF1 | 100 | 1.0 | |
| 78 | Comparative Example 38 | GF1 | 100 | 1.0 | |
| 79 | Invention Example 41 | GF1 | 100 | 1.0 | |
| 80 | Invention Example 42 | GF1 | 100 | 1.0 | |
| 81 | Comparative Example 39 | GF1 | — | — | The test was quit because of aggregation of the urethane resin |
| 82 | Comparative Example 40 | GF1 | — | — | The test was quit because of aggregation of the urethane resin |
| 83 | Invention Example 43 | GF1 | 100 | 1.0 | |
| 84 | Comparative Example 41 | GF1 | 100 | 1.0 | |
| 85 | Invention Example 44 | GF2 | 100 | 1.0 | |
| 86 | Invention Example 45 | GF3 | 100 | 1.0 | |
| 87 | Invention Example 45 | GF4 | 100 | 1.0 | |
| 88 | Invention Example 46 | GF5 | 100 | 1.0 | |

TABLE 14

| No. | | Corrosion resistance | | | Blackening resistance (4) | Heat discoloration resistance (5) | Coating properties | | Solvent resistance (8) | Liquid stability (9) Appearance | Sweat resistance (10) | Lubricity (11) |
|---|---|---|---|---|---|---|---|---|---|---|---|---|
| | | (1) Flat portion | (2) Bent portion | (3) After degreasing | | | (6) Without degreasing | (7) After degreasing | | | | |
| 1 | Invention Example 1 | A | A | A | A | A | A | A | A | A | A | C |
| 2 | Invention Example 2 | A | B+ | A | A | B | A | A | A | A | A | D |
| 3 | Invention Example 3 | A | B− | A | A | B | A | A | A | A | A | D |
| 4 | Comparative Example 1 | A | D | A | A | D | A | A | A | A | A | D |
| 5 | Invention Example 4 | A | A | A | A | A | A | B+ | B | A | A | C |
| 6 | Invention Example 5 | A | A | B− | A | A | A | B− | B− | A | A | C |
| 7 | Comparative Example 2 | A | A | C | A | A | A | C | D | A | A | C |
| 8 | Comparative Example 3 | A | D | D | A | A | B | D | B+ | A | A | C |
| 9 | Comparative Example 4 | A | D | B | A | A | A | A | A | A | A | C |
| 10 | Comparative Example 5 | B | D | D | A | A | A | A | A | A | A | C |
| 11 | Comparative Example 6 | A | C | D | A | A | A | D | A | C | A | C |
| 12 | Comparative Example 7 | A | D | B | A | A | A | B | A | A | A | D |
| 13 | Comparative Example 8 | A | D | B | A | A | A | B+ | A | A | A | D |
| 14 | Comparative Example 9 | A | D | C | A | C | A | B− | D | A | A | C |
| 15 | Invention Example 6 | A | A | A | A | A | A | A | A | A | A | C |
| 16 | Invention Example 7 | A | B | A | A | A | A | A | A | A | A | C |
| 17 | Invention Example 8 | A | A | A | A | A | A | A | A | A | A | C |
| 18 | Invention Example 9 | A | A | A | A | A | A | A | A | A | A | C |
| 19 | Comparative Example 10 | A | B | B | A | C | B+ | C | D | A | A | C |
| 20 | Invention Example 10 | A | B+ | B+ | A | B | A | A | A | A | A | C |
| 21 | Invention Example 11 | A | B+ | A | A | A | A | A | A | A | A | D |
| 22 | Comparative Example 11 | A | D | B | A | A | A | A | A | A | A | D |
| 23 | Comparative Example 12 | C | C | D | A | A | B+ | D | B+ | A | A | C |
| 24 | Invention Example 12 | B | B− | B− | A | A | A | A | A | A | A | C |
| 25 | Invention Example 13 | A | B− | A | A | A | A | A | A | A | A | C |
| 26 | Comparative Example 13 | A | D | A | A | A | A | A | A | C | A | C |

TABLE 14-continued

| No. | | Corrosion resistance | | | | Heat discoloration resistance (5) | Coating properties | | Solvent resistance (8) | Liquid stability (9) Appearance | Sweat resistance (10) | Lubricity (11) |
|---|---|---|---|---|---|---|---|---|---|---|---|---|
| | | (1) Flat portion | (2) Bent portion | (3) After degreasing | Blackening resistance (4) | | (6) Without degreasing | (7) After degreasing | | | | |
| 27 | Comparative Example 14 | D | D | D | A | A | A | A | B | A | A | C |
| 28 | Invention Example 14 | B | B− | B− | A | A | A | A | A | A | A | C |
| 29 | Invention Example 15 | B+ | B− | B− | A | A | A | B | A | A | A | C |
| 30 | Comparative Example 15 | A | B− | D | A | A | A | D | B | A | A | C |
| 31 | Invention Example 16 | A | A | A | B | A | A | A | A | A | A | C |
| 32 | Comparative Example 16 | A | A | A | C | A | A | A | A | A | A | C |
| 33 | Comparative Example 17 | A | A | A | D | A | A | A | A | A | A | C |
| 34 | Comparative Example 18 | A | B | A | A | A | A | A | A | D | A | C |
| 35 | invention Example 17 | A | A | A | A | A | A | A | A | A | A | C |
| 36 | Invention Example 18 | A | A | A | A | A | A | A | A | A | B | C |
| 37 | Comparative Example 19 | A | A | A | A | A | A | A | A | A | C | C |
| 38 | Invention Example 19 | B | B− | B− | A | A | A | A | A | B | A | C |
| 39 | Comparative Example 20 | D | D | D | A | A | A | A | A | D | A | C |
| 40 | Invention Example 20 | A | A | A | A | A | A | A | A | A | A | C |
| 41 | invention Example 21 | A | A | B | A | A | A | A | A | A | B− | C |
| 42 | Invention Example 22 | A | A | B− | A | A | A | A | A | A | B− | C |
| 43 | Invention Example 23 | A | A | A | A | A | A | A | A | A | A | C |
| 44 | Invention Example 24 | A | A | A | A | A | A | A | A | A | A | A |
| 45 | Invention Example 25 | A | A | A | A | A | A | A | A | A | A | A |
| 46 | Invention Example 26 | A | A | A | A | A | A | A | A | A | A | C |
| 47 | Invention Example 27 | A | A | A | A | A | A | A | A | A | A | B |
| 48 | Comparative Example 21 | B− | D | B− | A | A | C | C | A | A | A | C |
| 49 | Comparative Example 22 | B | C | B− | A | A | B | B | A | A | A | C |
| 50 | Invention Example 28 | B+ | B+ | B+ | A | A | A | A | A | A | A | C |
| 51 | Invention Example 29 | A | A | A | A | A | A | A | A | A | A | C |
| 52 | Comparative Example 23 | C | C | C | A | A | A | A | B | A | A | C |
| 53 | Comparative Example 24 | | | | | The test quit due to gelation of the agent | | | | | | | |
| 54 | Comparative Example 25 | D | D | D | A | A | A | B− | A | A | B− | C |
| 55 | Invention Example 30 | B | B− | B− | B | A | A | A | A | A | B | C |
| 56 | Invention Example 31 | B+ | B− | B− | A | A | A | A | A | A | A | C |
| 57 | Invention Example 32 | A | A | A | A | A | A | A | B+ | A | A | C |
| 58 | Invention Example 33 | A | A | A | A | B | B | B | B | A | A | C |
| 59 | Comparative Example 26 | A | B | A | A | B | D | D | C | A | A | C |
| 60 | Comparative Example 27 | B | B | D | A | A | B | D | C | A | A | C |
| 61 | Invention Example 34 | B+ | B+ | B+ | A | A | A | B | B | A | A | C |
| 62 | Invention Example 35 | A | A | A | A | A | A | A | A | A | A | C |
| 63 | Comparative Example 28 | A | C | A | A | A | C | C | A | A | A | C |
| 64 | Invention Example 36 | A | A | A | A | A | A | A | A | A | A | C |
| 65 | Comparative Example 29 | | | | The test quit due to undissolution in the treatment liquid being prepared | | | | | | | | |
| 66 | Comparative Example 30 | | | | The test quit due to undissolution in the treatment liquid being prepared | | | | | | | | |
| 67 | Comparative Example 31 | | | | The test quit due to undissolution in the treatment liquid being prepared | | | | | | | | |
| 68 | Comparative Example 32 | C | D | D | B | A | B | D | A | A | A | C |
| 69 | Comparative Example 33 | A | C | B | B | A | A | A | A | D | A | C |
| 70 | Invention Example 37 | A | A | A | A | A | A | A | A | A | A | C |
| 71 | Invention Example 38 | A | B | A | B | A | A | A | A | A | A | C |
| 72 | Invention Example 39 | A | A | B | A | A | A | B | A | A | A | C |
| 73 | Invention Example 40 | A | A | A | A | A | A | A | A | A | A | C |
| 74 | Comparative Example 34 | | | | The test quit due to undissolution in the treatment liquid being prepared | | | | | | | | |
| 75 | Comparative Example 35 | | | | The test quit due to undissolution in the treatment liquid being prepared | | | | | | | | |
| 76 | Comparative Example 36 | | | | The test quit due to undissolution in the treatment liquid being prepared | | | | | | | | |
| 77 | Comparative Example 37 | C | D | D | B | A | B | D | A | A | A | C |
| 78 | Comparative Example 38 | A | C | B | B | A | A | A | A | D | A | C |
| 79 | Invention Example 41 | A | A | A | A | A | A | A | A | A | A | C |
| 80 | Invention Example 42 | A | A | B | A | A | A | B | A | A | A | C |
| 81 | Comparative Example 39 | | | | The test quit due to aggregation of the urethane resin in the treatment liquid being prepared | | | | | | | | |
| 82 | Comparative Example 40 | | | | The test quit due to aggregation of the urethane resin in the treatment liquid being prepared | | | | | | | | |
| 83 | Invention Example 43 | A | A | A | A | A | A | A | A | A | A | C |
| 84 | Comparative Example 41 | A | C | D | B | A | B | C | B | A | A | C |
| 85 | Invention Example 44 | A | A | A | A | A | A | A | A | A | A | A |
| 86 | Invention Example 45 | A | A | A | A | A | A | A | A | A | A | A |
| 87 | Invention Example 45 | A | A | A | A | A | A | A | A | A | A | A |
| 88 | Invention Example 46 | A | A | A | A | A | A | A | A | A | A | A |

As shown in Tables 14, each of the tested steel sheets manufactured using a surface treatment liquid of the present invention has excellent corrosion resistance (at flat portions and processed portions, and after degreasing), blackening resistance, heat discoloration resistance, coating properties (without degreasing and after degreasing), solvent resistance, liquid stability, and sweat resistance.

On the other hand, with respect to Comparative Example 1 (No. 4) outside the scope of the present invention, the content of a cationic urethane resin emulsion (B) was not in the range specified by the present invention. Therefore, the corrosion resistance at the bent portion could not be obtained in the least, the heat resistance and lubricity of Comparative Example 1 were also insufficient. The content of a cationic urethane resin emulsion (B) in Comparative Example 2 (No.

7) exceeded the range specified in the present invention, so that the quality after alkaline degreasing was insufficient and the solvent resistance was also unsatisfactory. Comparative Example 3 (No. 8) and Comparative Example 4 (No. 9) do not contain an organic titanium chelate compound (D) according to the present invention; thus, the quality of the bent portions was not desirable.

With respect to Comparative Example 5 (No. 10), Comparative Example 7 (No. 12), and Comparative Example 8 (No. 13) which do not contain a quadrivalent vanadyl compound (E), the corrosion resistance at the bent portion was not desirable and the lubricity was also insufficient. Comparative Example 6 (No. 11) uses a pentavalent vanadyl compound; therefore, the corrosion resistance at the bent portion or after alkaline degreasing was undesirable, and the coating properties after alkaline degreasing were unsatisfactory. Comparative Example 9 (No. 14) used a quadrivalent vanadyl compound (E); however, the content of a cationic urethane resin emulsion (B) exceeded the range specified in the present invention. Therefore, the resulting corrosion resistance at the bent portion and the solvent resistance were undesirable. Note that Comparative Example 7 and Comparative Example 9 were tested based on zinc or zinc alloy-coated steel sheets disclosed in JP 3883831 and JP 2006-152436, respectively.

With respect to Comparative Example 10 (No. 19), the solid mass content of the silane coupling agent (C) was less than the range specified by the present invention, so that the solvent resistance was insufficient. On the other hand, the solid mass content of the silane coupling agent (C) in Comparative Example 11 (No. 22) exceeded the range specified by the present invention, so that the corrosion resistance at the bent portion was undesirable. With respect to Comparative Example 12 (No. 23), the solid content of a silane coupling agent (C) with respect to the mass content of titanium in an organic titanium chelate compound (D) exceeded the range specified by the present invention, which lead to insufficiency in corrosion resistance or coating properties after alkaline degreasing. With respect to Comparative Example 13 (No. 26), the like solid mass content was less than the range specified by the present invention; therefore, the corrosion resistance at the bent portion was undesirable, and the storage stability of the surface treatment liquid was insufficient.

With respect to Comparative Example 14 (No. 27), the mass content of vanadium in a quadrivalent vanadyl compound (E) with respect to the mass content of titanium in an organic titanium chelate compound (D) was less than the range specified by the present invention; thus, satisfactory corrosion resistance was not achieved. On the other hand, the mass content of the like vanadium in Comparative Example 15 (No. 30) exceeded the range specified by the present invention. Therefore, the corrosion resistance after alkaline degreasing and the coating properties after alkaline degreasing were insufficient.

With respect to Comparative Examples 16 (No. 32) and 17 (No. 33), the mass content of molybdenum in a molybdate compound (F) was less than the range specified by the present invention; therefore, the blackening resistance of each sample was insufficient. With respect to Comparative Example 18 (No. 34), the like mass content exceeded the range specified by the present invention; thus, the storage stability of the surface treatment liquid was insufficient.

With respect to Comparative Example 19 (No. 37), the mass content of fluorine in a fluorine compound (G) which is a feature of the present invention was less than the range specified by the present invention; thus, the sweat resistance was insufficient. With respect to Comparative Example 20 (No. 39), the like mass content exceeded the range specified by the present invention; thus, the corrosion resistance was insufficient.

With respect to Comparative Example 21 (No. 48), and Comparative Examples 22 (No. 49) to 23 (No. 52), the pH was not adjusted properly, so that the corrosion resistance of the bent portion was undesirable. With respect to Comparative Example 24 (No. 53) having a high pH, the surface treatment liquid gelated, which made it impossible to carry out the test.

With respect to Comparative Example 25 (No. 54), the film coating amount was less than the range specified by the present invention; therefore, sufficient corrosion resistance was not obtained. With respect to Comparative Example 26 (No. 59), the film coating amount exceeded the range specified by the present invention; therefore, the coating properties were unsatisfactory.

With respect to Comparative Example 27 (No. 60), the drying temperature was lower than the range specified by the present invention; therefore, the corrosion resistance after degreasing and the coating properties after degreasing were not desirable. With respect to Comparative Example 28 (No. 63), the drying temperature exceeded the range specified by the present invention; thus, the corrosion resistance at the bent portion and the coating properties were low.

With respect to the resin compound (A) in Comparative Example 29 (No. 65), Comparative Example 30 (No. 66), Comparative Example 34 (No. 74), and Comparative Example 35 (No. 75), the number of carbon atoms in a Z group exceeded the range specified by the present invention. Further, with respect to Comparative Example 31 (No. 67) and Comparative Example 36 (No. 76), the average number of substituted Z groups was less than the range specified by the present invention; thus, some material remained undissolved in the stage of preparing the surface treatment liquid. With respect to Comparative Example 32 (No. 69) and Comparative Example 37 (No. 77), the average number of substituted Z groups exceeded the range specified by the present invention; thus, the corrosion resistance at the bent portion and after alkaline degreasing was undesirable. With respect to Comparative Example 33 (No. 69) and Comparative Example 38 (No. 78), the average degree of polymerization of Z groups exceeded the range specified by the present invention; thus, the corrosion resistance at the bent portion and the storage stability were insufficient.

A urethane resin emulsion in Comparative Example 39 (No. 81) was nonionic, and a urethane resin emulsion in Comparative Example 40 (No. 82) was anioinic. Thus, the urethane resins aggregated in the stage of preparing the surface treatment liquid. With respect to Comparative Example 41 (No. 84), the silane coupling agent did not satisfy the range specified by the present invention; therefore, the corrosion resistance after alkaline degreasing was undesirable.

The present invention can provide surface-treated coated steel sheets mainly excellent in corrosion resistance (at a bent portion and after alkaline degreasing in particular), which are also excellent in heat resistance, coating properties, solvent resistance, and sweat resistance without chromate treatment.

The invention claimed is:

1. A surface treatment liquid for a zinc or zinc alloy-coated steel sheet comprising:
    (A) a resin compound having a bisphenol skeleton represented by general formula (I) below;
    (B) a cationic urethane resin emulsion having at least one type of cationic functional group selected from the group consisting of primary to tertiary amino groups and a quaternary ammonium base;
    (C) at least one type of silane coupling agent having at least one type of reactive functional group selected from the group consisting of active hydrogen-containing amino group, epoxy group, mercapto group, and methacryloxy group;
    (D) an organic titanium chelate compound;

(E) a quadrivalent vanadyl compound;
(F) a molybdate compound;
(G) a fluorine compound; and
(H) water, pH of said surface treatment liquid is in the range of 4 to 5, and wherein the components satisfy the following conditions (1) to (6):

(1) a solid mass ratio $[(B_s)/\{(A_s)+(B_s)+(C_s)\}]$, which is a ratio of solid mass content $(B_s)$ of said cationic urethane resin emulsion (B) with respect to the total solid mass content $\{(A_s)+(B_s)+(C_s)\}$ of said resin compound (A), said cationic urethane resin emulsion (B), and said silane coupling agent (C), is in the range of 0.10 to 0.30;

(2) a solid mass ratio $[(C_s)/\{(A_s)+(B_s)+(C_s)\}]$, which is a ratio of solid mass content $(C_s)$ of said silane coupling agent (C) with respect to the total solid mass content $\{(A_s)+(B_s)+(C_s)\}$ of said resin compound (A), said cationic urethane resin emulsion (B), and said silane coupling agent (C), is in the range of 0.60 to 0.85;

(3) a mass ratio $\{(C_s)/(D_{Ti})\}$, which is a ratio of solid mass content $(C_s)$ of said silane coupling agent (C) with respect to mass content $(D_{Ti})$ in terms of titanium standard of said organic titanium chelate compound (D), is in the range of 50 to 70;

(4) a mass ratio $\{(E_v)/(D_{Ti})\}$, which is a ratio of mass content $(E_v)$ in terms of vanadium standard of said quadrivalent vanadyl compound (E) with respect to mass content $(D_{Ti})$ in terms of titanium standard of said organic titanium chelate compound (D), is in the range of 0.30 to 0.50;

(5) a mass ratio $[(F_{Mo})/\{(A_s)+(B_s)+(C_s)\}]$, which is a ratio of mass content $(F_{Mo})$ in terms of molybdenum standard of said molybdate compound (F) with respect to the total solid mass content $\{(A_s)+(B_s)+(C_s)\}$ of said resin compound (A), said cationic urethane resin emulsion (B), and said silane coupling agent (C), is in the range of 0.003 to 0.03; and (6) a mass ratio $[(G_F)/\{(A_s)+(B_s)+(C_s)\}]$, which is a ratio of mass content $(G_F)$ in terms of fluorine standard of said fluorine compound (G) with respect to the total solid mass content $\{(A_s)+(B_s)+(C_s)\}$ of said resin compound (A), said cationic urethane resin emulsion (B), and said silane coupling agent (C), is in the range of 0.01 to 0.1;

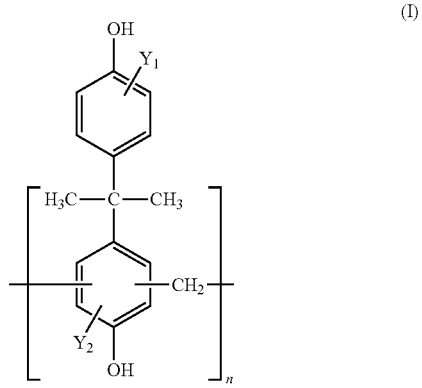

wherein in general formula (I), $Y_1$ and $Y_2$ respectively bonded to benzene rings independently represent a hydrogen atom or a Z group represented by general formula (II) or (III) below; the average number of substituent Z groups per benzene ring is in the range of 0.2 to 1.0; and "n" is an integer in the range of 2 to 50;

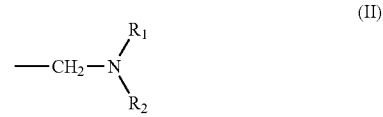

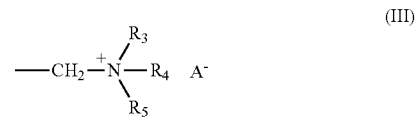

and wherein in general formula (II) or (III), $R_1$, $R_2$, $R_3$, $R_4$, and $R_5$ independently represent a hydrogen atom, a $C_1$-$C_{10}$ alkyl group, or a $C_1$-$C_{10}$ hydroxyalkyl group; and $A^-$ represents a hydroxide ion or an acid ion.

2. The surface treatment liquid for a zinc or zinc alloy-coated steel sheet according to claim 1, further comprising wax (W), wherein a mass ratio $[(W_s)/\{(A_s)+(B_s)\}]$, which is a ratio of solid mass content $(W_s)$ of the wax (W) with respect to the total solid mass content $\{(A_s)+(B_s)\}$ of said resin compound (A) and said cationic urethane resin emulsion (B), is in the range of 0.2 to 0.4.

3. A method of manufacturing a zinc or zinc alloy-coated steel sheet, comprising the steps of:

applying the surface treatment liquid of claim 1 to a surface of the zinc or zinc alloy-coated steel sheet so that a coating amount after drying is in the range of 0.2 g/m² to 1.8 g/m² per surface; and drying the zinc or zinc alloy-coated steel sheet at an ultimate sheet temperature in the range of 50° C. to 180° C.

4. A zinc or zinc alloy-coated steel sheet produced by the process of claim 3.

5. A method of manufacturing a zinc or zinc alloy-coated steel sheet, comprising the steps of:

applying the surface treatment liquid of claim 2 to a surface of the zinc or zinc alloy-coated steel sheet so that a coating amount after drying is in the range of 0.2 g/m² to 1.8 g/m² per surface; and drying the zinc or zinc alloy-coated steel sheet at an ultimate sheet temperature in the range of 50° C. to 180° C.

6. A zinc or zinc alloy-coated steel sheet produced by the process of claim 5.

* * * * *